United States Patent
Aiken, Jr. et al.

(10) Patent No.: US 6,430,622 B1
(45) Date of Patent: Aug. 6, 2002

(54) METHODS, SYSTEMS AND COMPUTER PROGRAM PRODUCTS FOR AUTOMATED MOVEMENT OF IP ADDRESSES WITHIN A CLUSTER

(75) Inventors: John Andrew Aiken, Jr., Raleigh, NC (US); Michael Edward Baskey, Wappingers Falls, NY (US); James L. Hall, Raleigh, NC (US); Dilip Dinkar Kandlur, Yorktown Heights, NY (US); Andrew H. Richter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/401,419

(22) Filed: Sep. 22, 1999

(51) Int. Cl.[7] .................. G06F 15/16; G06F 15/173

(52) U.S. Cl. .................. 709/245; 709/239; 709/230

(58) Field of Search .................. 709/245, 239, 709/230, 232, 217, 105; 714/4

(56) References Cited

U.S. PATENT DOCUMENTS

| | | | |
|---|---|---|---|
| 4,403,286 A | 9/1983 | Fry et al. | 364/200 |
| 4,495,570 A | 1/1985 | Kitajima et al. | 364/200 |
| 4,577,272 A | 3/1986 | Ballew et al. | 364/200 |

(List continued on next page.)

OTHER PUBLICATIONS

A. Dahlin, et al. EDDIE A Robust and Scalable Internet Server. Ericsson Telecom AB, Stockholm, Sweden, pp. 1–7 (May 1998).

Brochure entitled, ACEdirector™ 8–Port 10/100 MBPS Ethernet Switch. Alteon WebSystems, San Jose, CA (1999).

Brochure entitled, Enhancing Web User Experience with Global Server Load Balancing. Alteon WebSystems, San Jose, CA (Jun. 1999).

Brochure entitled, The Next Step in Server Load Balancing. Alteon WebSystems, San Jose, CA (Nov. 1999).

Mac Devine. Presentation entitled, TCP/IP Application Availability and Workload Balancing in the Parallel Sysplex. Share Technical Conference (Aug. 22–27, 1999).

http://w3.enterlib.ibm.com:80/cgi–bin/bookmgr/books/F1AF7001/1.3.1.2; 1.3.1.2.5 Virtual IP Addressing (VIPA); Excerpt from IP Configuration for OS/390, pp. 1–4 (1998).

http://w3.enterlib.ibm.com:80/cgi–bin/bookmgr/books/F1AF7001/1.3.2; 1.3.20 Device and Link Statement—Virtual Devices (VIPA); Excerpt from IP Configuration for OS/390, pp. 1–3 (1998).

http://w3.enterlib.ibm.com:80/cgi–bin/bookmgr/books/F1AF7001/1.3.2; 1.3.23. Home Statement; Excerpt from IP Configuration for OS/390, pp. 1–6 (1998).

Dahlin, A., et al., EDDIE, A Robust and Scalable Internet Server, Ericsson Telecom AB, Stockholm Sweden, pp. 1–7 (May 1998).

* cited by examiner

Primary Examiner—Zarni Maung
(74) Attorney, Agent, or Firm—Jerry W. Herndon; Myers Bigel Sibley & Sajovec, P.A.

(57) ABSTRACT

Methods, systems and computer program products are provided for transferring a Virtual IP Address (VIPA) from a first application instance to a second application instance executing on a cluster of data processing systems having a plurality of communication protocol stacks. A list of dynamic VIPAs is distributed among the protocol stacks and a hierarchy of backup communication protocol stacks for the dynamic VIPAs is determined based on the list of dynamic VIPAs. Upon receiving notification of failure of the first stack the second stack evaluates the hierarchy of backup stacks to determine if it is the next stack in the hierarchy for the VIPA associated with the first application instance. If so, then the VIPA associated with the first application instance is transferred to the second communication protocol stack associated with the second application instance.

32 Claims, 9 Drawing Sheets

U.S. PATENT DOCUMENTS

| | | | |
|---|---|---|---|
| 5,031,089 A | 7/1991 | Liu et al. | 364/200 |
| 5,675,739 A | 10/1997 | Eilert et al. | 395/200 |
| 5,917,997 A | 6/1999 | Bell et al. | 395/182.02 |
| 5,923,854 A | 7/1999 | Bell et al. | 395/200.73 |
| 5,935,215 A | 8/1999 | Bell et al. | 709/239 |
| 5,951,650 A | 9/1999 | Bell et al. | 709/238 |
| 6,023,734 A * | 2/2000 | Ratcliff et al. | 709/300 |
| 6,078,964 A * | 6/2000 | Ratcliff et al. | 709/300 |
| 6,084,859 A * | 7/2000 | Ratcliff et al. | 370/252 |
| 6,101,543 A * | 8/2000 | Alden et al. | 709/229 |
| 6,175,874 B1 * | 1/2001 | Imai et al. | 709/238 |
| 6,185,218 B1 * | 2/2001 | Raycliff et al. | 370/405 |
| 6,266,335 B1 * | 7/2001 | Bhaskaran | 370/399 |
| 6,343,322 B2 * | 1/2002 | Nagami et al. | 709/227 |

METHODS, SYSTEMS AND COMPUTER PROGRAM PRODUCTS FOR AUTOMATED MOVEMENT OF IP ADDRESSES WITHIN A CLUSTER

FIELD OF THE INVENTION

The present invention relates to network communications and more particularly to network communications to a cluster of data processing systems.

BACKGROUND OF THE INVENTION

The Internet Protocol (IP) is a connectionless protocol. IP packets are routed from originator through a network of routers to the destination. All physical adapter devices in such a network, including those for client and server hosts, are identified by an IP Address which is unique within the network. One valuable feature of IP is that a failure of an intermediate router node or adapter will not prevent a packet from moving from source to destination, as long as there is an alternate path through the network.

In Transmission Control Protocol/Internet Protocol (TCP/IP), TCP sets up a connection between two endpoints, identified by the respective IP addresses and a port number on each. Unlike failures of an adapter in an intermediate node, if one of the endpoint adapters (or the link leading to it) fails, all connections through that adapter fail, and must be reestablished. If the failure is on a client workstation host, only the relatively few client connections are disrupted, and usually only one person is inconvenienced. However, an adapter failure on a server means that hundreds or thousands of connections may be disrupted. On a S/390 with large capacity, the number may run to tens of thousands.

To alleviate this situation, International Business Machines Corporation introduced the concept of a Virtual IP Address, or VIPA, on its TCP/IP for OS/390 V2R5 (and added to V2R4 as well). A VIPA is configured the same as a normal IP address for a physical adapter, except that it is not associated with any particular device. To an attached router, the TCP stack on OS/390 simply looks like another router. When the TCP stack receives a packet destined for one of its VIPAs, the inbound IP function of the TCP stack notes that the IP address of the packet is in the TCP stack's Home list of IP addresses and forwards the packet up the TCP stack. The "home list" of a TCP stack is the list of IP addresses which are "owned" by the TCP stack. Assuming the TCP stack has multiple adapters or paths to it (including a Cross Coupling Facility (XCF) path from other TCP stacks in a Sysplex), if a particular physical adapter fails, the attached routing network will route VIPA-targeted packets to the TCP stack via an alternate route. The VIPA may, thus, be thought of as an address to the stack, and not to any particular adapter.

While the use of VIPAs may remove hardware and associated transmission media as a single point of failure for large numbers of connections, the connectivity of a server can still be lost through a failure of a single stack or an MVS image. The VIPA Configuration manual for OS/390 tells the customer how to configure the VIPA(s) for a failed stack on another stack, but this is a manual process. Substantial down time of a failed MVS image or TCP stack may still result until operator intervention to manually reconfigure the TCP stacks in a Sysplex to route around the failed TCP stack or MVS image.

While merely restarting an application with a new IP address may resolve many failures, applications use IP addresses in different ways and, therefore, such a solution may be inappropriate. The first time a client resolves a name in its local domain, the local Dynamic Name Server (DNS) will query back through the DNS hierarchy to get to the authoritative server. For a Sysplex, the authoritative server should be DNS/Workload Manager (WLM). DNS/WLM will consider relative workloads among the nodes supporting the requested application, and will return the IP address for the most appropriate available server. IP addresses for servers that are not available will not be returned. The Time to Live of the returned IP address will be zero, so that the next resolution query (on failure of the original server, for example) will go all the way back to the DNS/WLM that has the knowledge to return the IP address of an available server.

However, in practice, things do not always work as described above. For example, some clients are configured to a specific IP address, thus requiring human intervention to go to another server. However, the person using the client may not have the knowledge to reconfigure the client for a new IP address. Additionally, some clients ignore the Time to Live, and cache the IP address as long as the client is active. Human intervention may again be required to recycle the client to obtain a new IP address. Also, DNSs are often deployed as a hierarchy to reduce network traffic, and DNSs may cache the IP address beyond the stated Time to Live even when the client behaves quite correctly. Thus, even if the client requests a new IP address, the client may receive the cached address from the DNS. Finally, some users may prefer to configure DNS/WLM to send a Time to Live that is greater than zero, in an attempt to limit network-wide traffic to resolve names. Problems arising from these various scenarios may be reduced if the IP address with which the client communicates does not change. However, as described above, to affect such a movement of VIPAs between TCP stacks requires operator intervention and may result in lengthy down times for the applications associated with the VIPA.

Previous approaches to increased availability focused on providing spare hardware. The High-Availability Coupled Multi-Processor (HACMP) design allows for taking over the MAC address of a failing adapter on a shared medium (LAN). This works both for a failing adapter (failover to a spare adapter on the same node) or for a failing node (failover to another node via spare adapter or adapters on the takeover node.) Spare adapters are not used for IP traffic, but they are used to exchange heartbeats among cluster nodes for failure detection. All of the work on a failing node goes to a single surviving node. In addition to spare adapters, and of course access to the same application data, the designated failover node must also have sufficient spare processing capacity to handle the entire failing node workload with "acceptable" service characteristics (response and throughput).

Automatic restart of failing applications also provides faster recovery of a failing application or node. This may be acceptable when the application can be restarted in place, but is less useful when the application is moved to another node, unless the IP address known to the clients can be moved with the application, or dynamic DNS updates with alternate IP addresses can be propagated to a DNS local to clients sufficiently quickly.

Other attempts at error recovery have included the EDDIE system described in a paper titled "EDDIE, A Robust and Scalable Internet Server" by A. Dahlin, M. Froberg, J. Grebeno, J. Walerud, and P. Winroth, of Ericsson Telecom AB, Stockholm, Sweden, May 1998. In the EDDIE approach a distributed application called "IP Address Migration Application" controls all IP addresses in the cluster. The cluster is connected via a shared-medium LAN. IP address aliasing is used to provide addresses to individual applications over a single adapter, and these aliases are located via Address Resolution Protocol (ARP) and ARP caches in the TCP/IPs. The application monitors all server applications and hardware, and reallocates aliased IP addresses in the event of failure to surviving adapters and nodes. This approach allows applications of a failing node to be distributed among surviving nodes, but it may require the monitoring application to have complete knowledge of the application and network adapter topology in the cluster. In this sense, it is similar to existing Systems Management applications such as those provided by International Business Machines Corporation's Tivoli® network management software, but the IP Address Migration Application has direct access to adapters and ARP caches. The application also requires a dedicated IP address for inter-application communication and coordination.

In light of the above discussion, a need exists for improvements in recovery or movement of IP addresses within a cluster of data processing systems.

SUMMARY OF THE INVENTION

In view of the above discussion, it is an object of the present invention to provide for automatic recovery from failures of a communication protocol stack in a cluster of computers.

A further object of the present invention is to allow for recovery from protocol stack failures without requiring clients or servers connected to the failed protocol stacks to update cached addresses associated with the failed stack.

Still another object of the present invention is to allow automatic recovery from a protocol stack failure without requiring dedicated backup hardware.

Another object of the present invention is to provide for recovery from a protocol stack failure without reservation of capacity on a recovering system.

Yet another object of the present invention is to allow automatic recovery from a protocol stack failure without requiring additional monitoring applications or additional addresses dedicated to a recovery mechanism.

A still further object of the present invention is to allow automatic recovery from a protocol stack failure without requiring a single backup to be capable of handling the entire workload of the failed protocol stack.

These and other objects of the present invention may be provided by methods, systems, and computer program products which provide dynamic Virtual IP Addresses (VIPAs). Dynamic VIPAs are VIPAs which may be automatically moved from one protocol stack to another and are, thus, associated with an application or application group (recoverable entity) as opposed to a network adapter or host/system.

Thus, the present invention may provide for transferring a Virtual IP Address (VIPA) from a first application instance to a second application instance, where the first application instance and the second application instance are executing on a cluster of data processing systems having a plurality of communication protocol stacks associated therewith and where the first application instance is associated with a first of the plurality of communication protocol stacks and the second application instance is associated with a second of the plurality of communication protocol stacks by distributing among the plurality of communication protocol stacks a list of dynamic VIPAs. A hierarchy of backup communication protocol stacks for the dynamic VIPAs is determined based on the list of dynamic VIPAs. Upon receiving notification of failure of the first communication protocol stack the second communication protocol stack evaluates the hierarchy of backup communication protocol stacks to determine if it is the next communication protocol stack in the hierarchy of backup communication protocol stacks for the VIPA associated with the first application instance. If so, then the VIPA associated with the first application instance is transferred to the second communication protocol stack associated with the second application instance.

In a further embodiment of the present invention where a specific address is associated with an application instance, transfer of such specific dynamic VIPAs may be accomplished by establishing a range of dynamic VIPAs associated with the communication protocol stacks which are valid specific dynamic VIPAs. Information as to the bind status of dynamic VIPAs associated with the communication protocol stacks is then distributed among the communication protocol stacks to allow the communication protocol stacks to determine if a dynamic VIPA has been bound to an application instance. Upon notification of failure of a communication protocol stack the bind status of dynamic VIPAs bound to the failed communication protocol stack is reset so as to allow bind calls to the dynamic VIPAs bound to the failed communication protocol stack. When a request to bind the second instance of the application with the first VIPA of the first application instance is received at another communication protocol stack, the second application instance is bound to the first VIPA at the second communication protocol stack so as to allow communications to the second application instance through the second communication protocol stack utilizing the first VIPA.

By communicating between the protocol stacks, the hierarchy of backups may be established so that the protocol stacks themselves may handle takeover of dynamic VIPAs for failed stacks or operating system images. Furthermore, this recovery may be automatic as the protocol stacks are notified of the failure of another protocol stack in the cluster and has available sufficient information to know which protocol stack should take over a dynamic VIPA of a failed protocol stack. Thus, the automatic recovery may be accomplished without the need for a global monitoring application to control the transfer of addresses as the transfer is controlled by the protocol stacks themselves. Also, because the recovery utilizes VIPAs, clients or servers connected to the failed protocol stacks may not need to update cached addresses associated with the failed stack. Because the dynamic VIPAs associated with a failed stack are transferred to other protocol stacks in the cluster, there may be no need to provide dedicated backup hardware.

In particular embodiments of the present invention, the list of dynamic VIPAs is distributed by broadcasting from communication protocol stacks supporting dynamic VIPAs, a VIPA define message which provides identification of active dynamic VIPAs associated with the broadcasting communication protocol stack and which provides identification of dynamic VIPAs for which the broadcasting communication protocol stack is a backup communication protocol stack. Furthermore, the VIPA define message may include a priority associated with the dynamic VIPAs for which the broadcasting communication protocol stack is a backup communication protocol stack.

When a communication protocol stack receives a broadcast VIPA define message, the communication protocol stack may establish, for each VIPA in the VIPA define message, a list of communication protocol stacks associated with the VIPA so as to provide a list of the hierarchy of backup communication protocol stacks associated with the VIPA. Preferably, the list of communications protocol stacks is in the order of priority of the communication protocol stacks.

In a still further embodiment of the present invention, if a received broadcast VIPA define message defines a communication protocol stack as a primary communication protocol stack for a dynamic VIPA identified as an active dynamic VIPA at the communication protocol stack receiving the VIPA define message, then the active dynamic VIPA may be deleted at the receiving communication protocol stack. Furthermore, the deletion of the active dynamic VIPA may be delayed if an active connection exists to the active dynamic VIPA. If so, then a VIPA delayed giveback message may be sent so as to notify other communication protocol stacks that the communication protocol stack which received the VIPA define message will delete the active dynamic VIPA when there are no connections to the active dynamic VIPA. Also, the communication protocol stack which transmitted the VIPA define message, responsive to receiving the VIPA delayed giveback message, may then broadcast a VIPA define message identifying the communication protocol stack which transmitted the VIPA define message as a backup protocol stack for the active dynamic VIPA having a highest priority.

In yet another embodiment of the present invention, notification of the restart of the first communication protocol stack may be provided to other of the plurality of communication protocol stacks. If the first communication protocol stack is the primary communication protocol stack associated with an active dynamic VIPA of the second communication protocol stack, then the active dynamic VIPA is deleted at the second communication protocol stack. The second communication protocol stack, responsive to deleting the active dynamic VIPA, may then broadcast a VIPA define message identifying the second communication protocol stack as a backup protocol stack for the active dynamic VIPA. As described above, the deletion of the active dynamic VIPA may be delayed if a connection exists to the active dynamic VIPA.

In a particular preferred embodiment of the present invention, dynamic VIPAs in the range of dynamic VIPAs and dynamic VIPAs in the list of dynamic VIPAs are mutually exclusive.

In another embodiment of the present invention, the request to bind the second application to the first VIPA at the second of the plurality of communication protocol stacks is a BIND call which specifies the first VIPA.

Furthermore, where a request is made for a specific dynamic VIPA, it may be determined if the requested VIPA is active on a communication protocol stack other than the communication protocol stack receiving the request. If so, the bind request may be rejected. If the bind call is not rejected, however, the communication protocol stacks may be notified that the requested dynamic VIPA is active at a communication protocol stack.

In yet another embodiment of the present invention, the request to bind an application to a specific dynamic VIPA is an IOCTL command which specifies the specific dynamic VIPA. In such a case, the dynamic VIPA may be activate on the communication protocol stack irrespective of whether the dynamic VIPA is active another communication protocol stack. The dynamic VIPA may then be deleted from all communication protocol stacks other than the communication protocol stack on which it was activated.

As will further be appreciated by those of skill in the art, the present invention may be embodied as methods, apparatus/systems and/or computer program products.

DETAILED DESCRIPTION OF THE INVENTION

Figure 1:
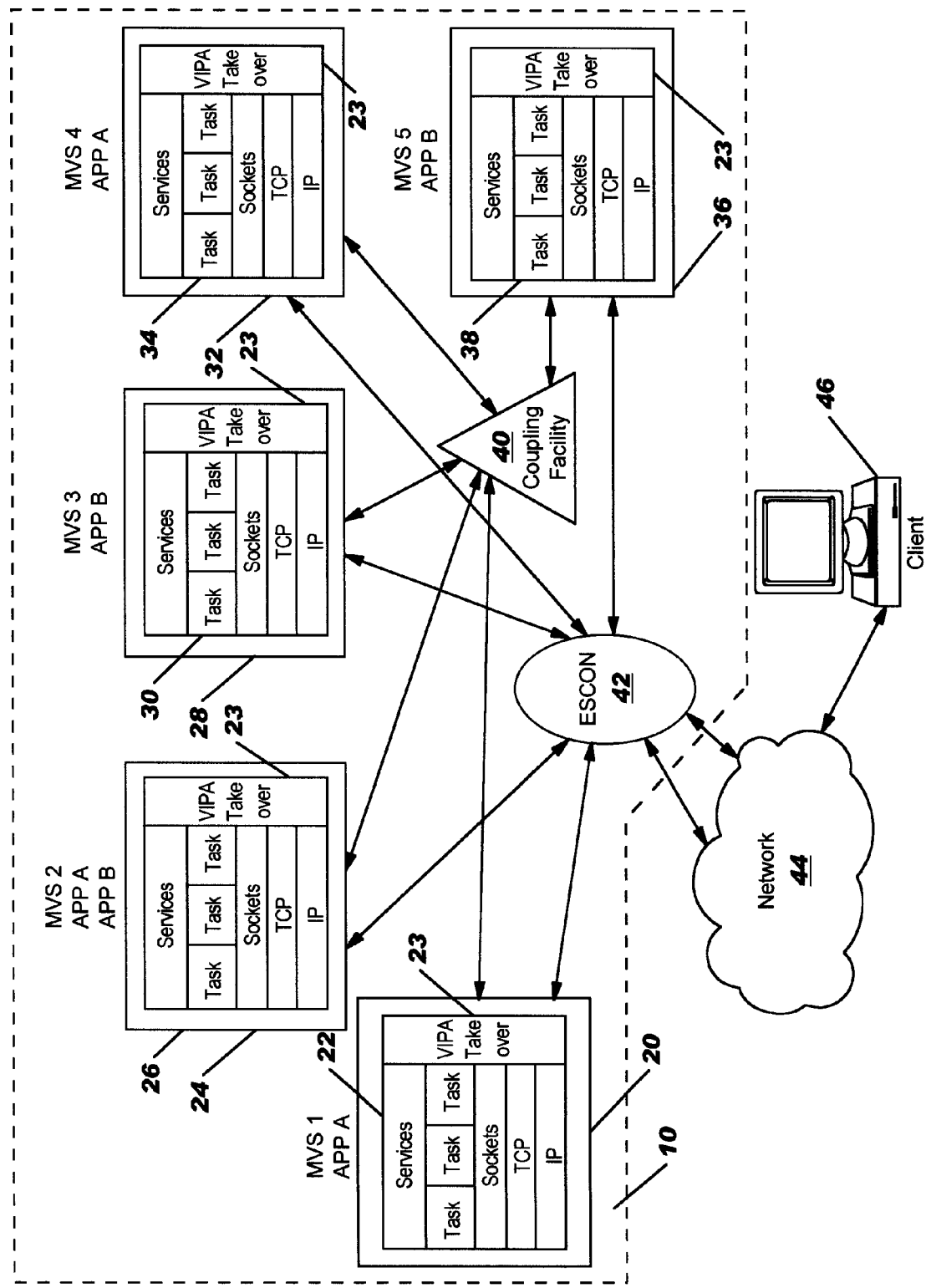
FIG. 1 is block diagram of a cluster of data processing systems incorporating the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention can be embodied as systems, methods, or computer program products which allow for other communication protocol stacks in a cluster of data processing systems to automatically take over Virtual IP Addresses (VIPAs) upon failure of another communication protocol stack in the cluster. VIPAs capable of such automatic takeover are referred to herein as "dynamic VIPAs." While the present invention is described with reference to a specific embodiment in an OS/390 Sysplex, as will be appreciated by those of skill in the art, the present invention may be utilized in other systems where clusters of computers utilize virtual addresses by associating an application or application group rather than a particular communications adapter with the addresses. Thus, the present invention should not be construed as limited to the particular exemplary embodiment described herein.

A cluster of data processing systems is illustrated in FIG. 1 as a cluster nodes in Sysplex 10. As seen in FIG. 1, several data processing systems 20, 24, 28, 32 and 36 are interconnected in a Sysplex 10. The data processing systems 20, 24, 28, 32 and 36 illustrated in FIG. 1 may be operating system images, such as MVS images, executing on one or more computer systems. While the present invention will be described primarily with respect to the MVS operating system executing in an OS/390 environment, the data processing systems 20, 24, 28, 32 and 36 may be mainframe computers, mid-range computers, servers or other systems capable of supporting Virtual IP Addresses and which are capable of error recovery as described herein.

As is further illustrated in FIG. 1, the data processing systems 20, 24, 28, 32 and 36 have associated with them communication protocol stacks 22, 26, 30, 34 and 38, which may be TCP/IP stacks. The communication protocol stacks 22, 26, 30, 34 and 38 have been modified to incorporate a VIPA takeover function 23 as described herein for automatically transferring dynamic VIPAs from a failing communication protocol stack to a function communication protocol stack.

While each of the communication protocol stacks 22, 26, 30, 34 and 38 illustrated in FIG. 1 incorporate the VIPA takeover function 23, not all communication protocol stacks in a Sysplex need incorporate the VIPA takeover function 23. Thus, the present invention may be carried out on any system where two or more communication protocol stacks in a cluster of data processing systems support VIPA takeover. If a communication protocol stack does not support VIPA takeover, then the VIPA takeover messages according to the present invention would be ignored by the communication protocol stack. Thus, the present invention provides backward compatibility with existing communication protocol stacks.

As is further seen in FIG. 1, the communication protocol stacks 22, 26, 30, 34 and 38 may communicate with each other through a coupling facility 40 of the Sysplex 10, for example, utilizing XCF messaging. Furthermore, the communication protocol stacks 22, 26, 30, 34 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize network 44 to communicate with an application executing on an MVS image in Sysplex 10 through the communication protocol stacks 22, 26, 30, 34 and 38.

As is further illustrated in FIG. 1, as an example of utilization of the present invention and for illustration purposes, data processing system 20 has associated with it communication protocol stack 22 which is associated with MVS image MVS 1 which has application APP A executing on MVS image MVS 1 and utilizing communication protocol stack 22 to allow access to, for example, client 46 through network 44. Similarly, data processing system 24 has associated with it communication protocol stack 26 which is associated with MVS image MVS 2 which has a second instance of application APP A and an instance of application APP B executing on MVS image MVS 2 which may utilize communication protocol stack 26 for communications. Data processing system 28 has associated with it communication protocol stack 30 which is associated with MVS image MVS 3 which has a second instance of application APP B executing on MVS image MVS 3 which may utilize communication protocol stack 30 for communications. Data processing system 32 has associated with it communication protocol stack 34 which is associated with MVS image MVS 4 which has a third instance of application APP A executing on MVS image MVS 4 which may utilize communication protocol stack 34 for communications. Finally, data processing system 36 has associated with it communication protocol stack 38 which is associated with MVS image MVS 5 which has a third instance of application APP B executing on MVS image MVS 5 which may utilize communication protocol stack 38 for communications.

Utilizing the above described system configuration as an example, the VIPA takeover function 23 will now be described. The VIPA takeover function 23 automates the movement of the dynamic VIPA to an appropriate surviving communication protocol stack in the event of failure. One aspect of the VIPA takeover function 23 according to the present invention allows automated movement to a stack where an existing suitable application instance already resides, allowing that instance to serve clients formerly going to the failed stack/node. Another aspect of the VIPA takeover function 23 allows dynamic VIPAs to be defined and activated through application action without modifying the applications themselves so that the dynamic VIPA moves when the application is moved. Thus, application instances on a failing cluster node may be distributed among many (or all) of the surviving nodes, allowing for reducing the amount of spare processing capacity that must be provisioned for each node that may participate in takeover. Where a dynamic VIPA is used simply to gain access to one of many suitable application instances, movement of that dynamic VIPA on stack or node failure is automatically handled by surviving stacks. Where a dynamic VIPA is tied to a specific application instance, the dynamic VIPA will be activated wherever the application instance is started—or moved.

For completely automated takeover, the communication protocol stacks 22, 26, 30, 34 and 38 may be configured as to which stack is primary, and which stacks may serve as backup—and in what preferred order. Different dynamic VIPAs may have different sets of backup stacks, possibly overlapping. For dynamic VIPAs tied to application instances, configuration will limit the specific values of the IP addresses of the dynamic VIPAs that may be started, so that a keying error in configuring a dynamic VIPA will not attempt to start an IP address that is not available to the installation or the organization. Within the constraints defined by customer configuration of the TCP/IPs in the cluster (Sysplex), however, there is complete freedom in initial placement and movement of application instances.

Server application instances, such as APP A and APP B of FIG. 1, may be deployed across the Sysplex 10 in different ways. In some cases, appropriate application instances are already available on multiple Sysplex nodes, serving any IP address. Dynamic VIPAs may be used to direct traffic to specific stacks or MVS images based on load, but other existing server instances would do equally well. However, it is preferred that a moved dynamic VIPA end up on a stack serving one of the existing application instances.

In other cases, the dynamic VIPA is specific to an application instance which may have unique data or state. In this case, if the application instance is restarted elsewhere, the dynamic VIPA should move along with it to a stack on the same MVS image. Note that these application instances may either bind to a specific IP address (the dynamic VIPA) or to any IP address; the requirement to move the dynamic VIPA to the right stack is the same in both cases.

Thus, the VIPA takeover function 23 of the communication protocol stacks 22, 26, 30, 34 and 38 preferably provides for three VIPA takeover scenarios. In particular, the VIPA takeover function 23 preferably provides for VIPA takeover where multiple homogeneous application instances are already executing utilizing differing communication protocol stacks. In such a case the communication protocol stacks 22, 26, 30, 34 and 38 collaborate to move the dynamic VIPA of a failing communication protocol stack to an appropriate communication protocol stack(as configured by the Sysplex administrator). Also, if an application instance binds to a specific (dynamic VIPA) address, the communication protocol stacks 22, 26, 30, 34 and 38 ensure that only one stack "owns" that dynamic VIPA at any one time. Finally, the VIPA takeover function 23 preferably allows an application instance to bind to any IP address (INADDR_ANY), but also allows association a specific dynamic VIPA with that specific application instance.

Turning now to the first of these scenarios, for the present example, application APP A has dynamic VIPAs VA1–VA3 assigned to the respective first, second and third instances of APP A; and application APP B likewise has VIPAs VB1–VB3 assigned to the respective first, second and third instances of APP B.

Configuration of a takeover hierarchy may be provided by a new definition block established by a system administrator for each communication protocol stack 22, 26, 30, 34 and 38. The new definition block defines dynamic VIPAs for which a communication protocol stack operates as the primary communication protocol stack and defines dynamic VIPAs for which the communication protocol stack acts as a backup communication protocol stack. Thus, a definition block "VIPADynamic" may be defined as VIPADynamic
    Dynamic VIPA definitions . . .
    ENDVIPADynamic The definitions within the VIPADynamic block for primary ownership are: ti VIPADEFine address_mask VIPA1 VIPA2 . . .

where the address_mask is used to determine the network prefix to be advertised to routing daemons for OSPF or RIP. Both network prefix (sometimes known as subnet address) and the mask will be advertised to the routing daemon. All of the VIPAs in a single VIPADEFine statement must belong to the same subnet, network, or supernet, as determined by the network class and address mask.

The definitions within the VIPADynamic block for backup are:

VIPABackup rank VIPAx VIPAy . . .

where the rank is a number between 1 and 254 used to determine relative order within the backup chain(s) for the associated dynamic VIPA(s). A communication protocol stack with the higher rank will take over the dynamic VIPAs before a communication protocol stack with a lower rank.

In this first scenario, the communication protocol stacks 22, 26, 30, 34 and 38 collaborate entirely among themselves to move dynamic VIPAs when a communication protocol stack or the hosting MVS fails. As part of the initialization process of the communication protocol stacks 22, 26, 30, 34 and 38, a takeover hierarchy is defined through messages broadcast by the VIPA takeover function 23 of each of the communication protocol stacks 22, 26, 30, 34 and 38 to the other communication protocol stacks 22, 26, 30, 34 and 38. At initialization or profile changes, the communication protocol stacks 22, 26, 30, 34 and 38 communicate to all partner communication protocol stacks the complete list of dynamic VIPAs, both primary and backup defined for the communication protocol stack.

When a communication protocol stack 22, 26, 30, 34 and 38 or MVS fails, the respective MVS for each surviving communication protocol stack notifies the communication protocol stack of the failure. The first stack (highest rank) in the backup list for each dynamic VIPA then creates and activates the VIPA dynamically and automatically, and advertises the dynamic VIPA to associated routing daemons for dynamic routing updates in attached routers. It is up to the system/cluster or DNS administrator to ensure that there is in fact a suitable application instance already in place and ready to serve new connection requests to the dynamic VIPA.

When the failed communication protocol stack is restarted, its primary dynamic VIPAs will only be activated when there are no active TCP connections to that dynamic VIPA on other communication protocol stacks. If other communication protocol stacks have active connections, activation on the 'primary' communication protocol stack will be delayed.

Returning to the example of FIG. 1, for MVS1 to MVS5 the VIPADEFine statements may be:

MVS1: VIPADEFine VA1
    MVS2: VIPADEFine VA2 VB1
    MVS3: VIPADEFine VB2
    MVS4: VIPADEFine VA3
    MVS5: VIPADEFine VB3

For purposes of illustration the respective address masks have been omitted because they are only significant to the routing daemons.

The order of the stacks in the backup lists for each dynamic VIPA is determined by the relative rank values on each VIPABackup statement. For clarity of the present example, the example was constructed such that each node needed only one VIPABackup statement with all backup dynamic VIPAs in it. A more complex example could have resulted in the need for a different rank value on each individual dynamic VIPA on each stack. This is handled by having individual VIPABackup statements with fewer dynamic VIPAs, or in the ultimate case only one dynamic VIPA for each. Note also that the rank value for a dynamic VIPA is significant only for other stacks specifying that same dynamic VIPA. In the example shown, both MVS1 and MVS3 have a rank value of 30. There is NOT a tie, because the dynamic VIPAs specified in the VIPABackup statement on MVS1 are different from the dynamic VIPAs specified on MVS3.

Thus, the VIPABackup statements for MVS1 to MVS5 of FIG. 1 may be:

MVS1: VIPABackup 30 VA2 VA3

MVS2: VIPABackup 20 VA1 VA3 VB2 VB3

MVS3: VIPABackup 30 VB1 VB3

MVS4: VIPABackup 40 VA1 VA2

MVS5: VIPABackup 10 VB1 VB2

For purposes of illustration, assume that MVS2 fails, taking with it the communication protocol stack 26 and the instances of applications APP A and APP B. MVS1, MVS3, MVS4 and MVS5 notify their respective communication protocol stacks 22, 30, 34 and 38 of the failure. For VA2, the dynamic VIPA for the instance of application APP A on MVS2, the first communication protocol stack in the backup chain is the communication protocol stack 34 on MVS4, since it was defined to have the highest VIPABackup rank (40) for VA2. MVS4, therefore, defines and activates dynamic VIPA VA4 in addition to VA3 to allow access to an instance of application APP A. Similarly, the communication protocol stack 30 on MVS3 defines and activates dynamic VIPA VB1 in addition to VB2 to allow access to an instance of application APP B.

At some time later, MVS2 and the communication protocol stack 26 and application instances for APP A and APP B are restarted. Assume further that at that time, application APP A does not have connections to VA4 on MVS4, but application APP B has connections via VB1 on MVS3. When the communication protocol stack 26 is started on MVS2, it notifies the other stacks of its intent to define and activate VA2 and VB1. The communication protocol stack 34 on MVS4 already has VA2 active, but does not have active connections through VA2, so it deletes VA2 and reverts to backup status. The communication protocol stack 26 on MVS2 thus "owns" VA4, and can advertise it to the routers via dynamic routing protocols.

On the other hand, the communication protocol stack 30 on MVS3 not only has VB2 active, but it also has active connections through VB1. It notifies the communication protocol stack 26 on MVS2 of this fact, and sets a flag that another stack desires VB1 when there are no more connections. The communication protocol stack 26 on MVS2 deactivates and deletes VB1, and declares itself backup for VB1 with a rank of 255. This puts the stack at the head of the backup chain, since the highest rank that can be configured is 254.

When the last connection to VB1 on the communication protocol stack 30 on MVS3 is closed, the stack deletes VB1, declares itself backup for VB1 at the former rank of 40, and notifies the other stacks. The communication protocol stack 26 on MVS2 notes that VB3 has transitioned from active to inactive, and that it is the first stack in the backup chain, so it defines and activates VB1. The Sysplex has now reverted to the stable pre-failure configuration.

As can be seen from the above example, when the original failed stack is restarted, giveback is graceful, in the sense that connections established on the backup communication protocol stack are not disrupted when the failing stack comes back up. If the installation wants traffic to revert to the restarted stack immediately, regardless of active connections, the system operator on the backup stack can issue VARY OBEY on a profile with VIPADELETE and VIPABACKUP for that dynamic VIPA. The VIPADELETE will delete the dynamic VIPA along with any active connections, and the VIPABackup will re-establish the communication protocol stack as a backup stack.

With other types of IP addressing, including conventional VIPAs, the stack reports the IP addresses in the Home list to DNS/WLM when the stack is activated. This means that DNS/WLM has an accurate picture of active IP addresses for each stack. However, DNS/WLM will report such IP addresses in resolving any supported application on that stack. To avoid having connections established to applications other than the ones associated with dynamic VIRAs, no Dynamic VIPAs will be reported by the stack to DNS/WLM. Dynamic VIPAs should be configured statically in DNS and associated with the corresponding applications.

Furthermore, this first scenario does not require any additional configuration for the application, since the application instances if the applications accept connection requests to any IP address. However, the Sysplex Administrator should ensure that Sysplex communication protocol stacks are configured properly, and that application instances remain active on all active stacks that may be backup for dynamic VIPAs associated with the application. The communication protocol stacks may have no knowledge of application instances at all. Thus, for example, in restarting MVS2, Applications App A and App B should be restarted prior to restarting the communication protocol stack 26, to ensure that they are ready to accept connection requests as soon as the dynamic VIPAs are reactivated on the communication protocol stack 26 on MVS2.

In the second scenario described above the application instance is configured to bind to a specific IP address and each application instance is distinct from other application instances. In other words, the first instance of APP is not the same as the second instance of APP A, even though both represent instances of application APP A. The difference may be specific requests that may be satisfied, or different backing data bases, or whatever other differences may exist. In this example, application instances are deployed as they were for the first scenario, but the respective dynamic VIPAs need to move with the application instances.

Another difference from the prior scenario is that failure of the application instance, stack, or MVS means that the application instance will be restarted elsewhere in the Sysplex. How this restart is accomplished is not determined by VIPA Takeover function 23 but could be by operator intervention, by Automatic Restart Manager (ARM), or other Sysplex-wide mechanism.

As described above, in this second scenario the application instance is configured to bind to a specific IP address. Normally, such a BIND( ) is successful only if the specified IP address is active on the communication protocol stack to which the application issues the BIND( ). The VIPA Takeover function 23 enhances the communication protocol stacks 22, 26, 30, 34 and 38 such that if the IP address is not in use on another communication protocol stack, and the communication protocol stack has been so configured, a dynamic VIPA will be activated on the target communication protocol stack. "In use" as used herein refers to active connections to that IP address on a communication protocol stack.

Because the communication protocol stacks 22, 26, 30, 34 and 38 exchange information about active IP addresses (including Dynamic VIPAs), the determination of whether a dynamic VIPA is in use can be made fairly quickly. If the dynamic VIPA is in use on another communication protocol stack, or the target communication protocol stack has not been configured to accept this particular request, the BIND( ) will fail with ENOADDR EADDRNOTAVAILBLE as it would for communication protocol stacks without the VIPA Takeover function 23.

The dynamic VIPAs to be activated in this manner should be grouped into subnets of their own. As an example, the VIPAs for instances of Application APP A could be grouped into one subnet with network prefix (subnet address) SN1 and address mask SNAM1, and similarly for Application APP B. A subnet could be defined for all applications, or a different subnet for each application, or combinations thereof. For the present example, application APP A dynamic VIPAs are assumed to be in SN1, and dynamic VIPAs for instances of Application APP B in SN2 with address mask SNAM2.

A configuration option to designate for each communication protocol stack 22, 26, 30, 34 and 38 the allowable subnet or subnets in which dynamic VIPAs may be activated dynamically by BIND(specific address) is also provided. The VIPARange statement does this:

VIPARANGE address_mask network_prefix where network_prefix is any IP address within the subnet, and address_mask is used to determine the subnet address to be advertised to the communication protocol stack's routing daemon. As many VIPARange statements may be specified on a communication protocol stack as needed to designate all subnets in which dynamic VIPAs may be activated. The subnets in VIPARange should not normally be the same as the subnets for VIPADEFine/VIPABackup, since a Dynamic VIPA may not simultaneously participate in automatic takeover (VIPADEFineNIPABackup) and be activated via BIND( ).

Once activated on a communication protocol stack via BIND( ), a dynamic VIPA remains active until the activating application terminates (address automatically deactivated by TCP/IP) unless the dynamic VIPA is moved to another stack. The system operator may delete an active dynamic VIPA by issuing VARY OBEY with a profile containing a VIPADELETE statement referencing the specific dynamic VIPA. When the VIPADELETE statement is processed, the dynamic VIPA is deactivated and deleted from the communication protocol stack. If the dynamic VIPA was activated by a BIND( ), it will not be activated automatically on another communication protocol stack until an application issues a BIND( ) to the same address at the other communication protocol stack.

For this second scenario, instances of application APP A may be deployed on MVS1, MVS2, and MVS4. Since the corresponding VIPAs have been organized into subnet SN1 with address mask SNAM1 the corresponding communication protocol stacks 22, 26 and 34 are configured with the following statement:

VIPARange SNAM1 SN1

Similarly, communication protocol stacks 26, 30 and 38 on MVS2, MVS3 and MVS5 have the following statement in a VIPADynamic block:

VIPARange SNAM2 SN2

When the properly configured application instances are started on the respective MVS images, the BIND( ) in each instance will cause activation of the corresponding dynamic VIPA. It does not matter which application instance is started on which stack/MVS image. Indeed, all of the instances of an application could be started on the same MVS image. Alternatively, there could be more stacks with the application VIPARange statement than actual started application instances. However, an appropriate VIPARange must be configured on a stack before an application can successfully BIND to a dynamic VIPA on that stack.

Assume now that MVS2 fails, similar to the prior scenario. The other communication protocol stacks 22, 30, 34 and 38 are notified of the failure of the MVS2, and they take note of the fact that dynamic VIPAs VA2 and VB1 are no longer active in the Sysplex 10. When the failure is detected, the second instance of application instance APP A is restarted (by ARM or a human) on MVS4. MVS4 has already been configured with the appropriate VIPARange for application APP A, so the BIND(VA2) by the second application instance APP A causes VA2 to be defined and activated on the communication protocol stack 34 on MVS4. Similarly, when the first instance of application APP B moves to MVS3, dynamic VIPA VB1 is activated on the associated communication protocol stack 30.

If, however, only the second instance of application APP A fails at MVS2, the communication protocol stack 26 notes the failure and clears the associated connections. These dynamic VIPAs are not advertised to DNS/WLM as general stack addresses, so it is reasonable to assume that there are no more connections to VA2 on MVS2. Thus, if the second instance of the application APP A is restarted on MVS1 (or MVS4), the BIND(VA2) causes deletion of VA2 on the communication protocol stack 26 on MVS2, and definition and activation of VA2 on MVS1 (or MVS4).

If the entire MVS2 fails and is restarted, along with the communication protocol stack 26 and the second instance of application APP A and the first instance of application APP B, MVS and communication protocol stack activation will proceed to completion. However, the BIND to VA2 or VB1 will succeed only if an application or TCP/IP previously bound to the dynamic VIPA is no longer running. If these instances have been restarted on other stacks while MVS2 and its communication protocol stack 26 are being restarted, the instances must be quiesced (via application mechanisms) or stopped before restarting those same instances on MVS2.

Application restart happens entirely independent of any stack function. Other than freeing up active connections on catastrophic application failure, the stack is not really aware of the application per se. This means that the restart manager may be as sophisticated as desired in determining on which stack or MVS image to restart a failed application instance, including consulting WLM. The solution works equally well for operator-managed restart or Network Management automation of the movement.

The final scenario is very similar to the second scenario, except that the application instance does not bind to a particular IP address. The Sysplex Administrator nonetheless desires to associate a particular IP address (dynamic VIPA) with each specific application instance. Otherwise, the application scenarios are identical.

If the application instance desires to BIND( ) to INADDR_ANY to accept connection requests to any IP address supported by the communication protocol stack, there is no implicit indication to the stack of which dynamic VIPA should be activated. However, an IOCTL command may be defined which allows the issuer to command the stack to activate a dynamic VIPA. This IOCTL may be made public, so new applications can exploit it if desired. Activation of the dynamic VIPA will succeed as long as the designated IP address is not claimed by one of the other communication protocol stacks as an IP address for a physical interface or a static VIPA, or defined via VIPADEFine or VIPABackup. The issuer must be APF Authorized or have Root Authority. Given this level of authority, if the Dynamic VIPA was activated earlier on another stack via BIND( ) or IOCTL, the dynamic VIPA will be deleted on the other stack, even if this means that existing connections are broken.

Communication protocol stack configuration to allow for this third scenario is the same as for the second scenario, namely a VIPARange defining a subnet containing the designated VIPA. There is no configuration difference between activation by BIND( ) or IOCTL, and the same VIPARange may be used for both if desired. Since the same dynamic VIPA may not be activated by IOCTL/BIND while also participating in automatic takeover as defined by VIPADEFine/VIPABackup, it is preferred that subnets for VIPADEFine be different from subnets for VIPARange.

This new IOCTL command may be used by new applications that desire to BIND(INADDR ANY) while still being associated with a specific dynamic VIPA. The application configuration should specify the dynamic VIPA or VIPAs to be used with IOCTL at application instance initialization.

To address the case where the application cannot be modified, possibly because the application has been purchased from a vendor and the source code is not available, a utility may be utilized that may be initiated via JCL, from the OMVS command line, or from a shell script. The utility may support a parameter specifying the dynamic VIPA to be activated. The utility may also be used to delete a dynamic VIPA, as an alternative to VARY OBEY by a system operator. However, the utility must be APF authorized or be executed from a user ID with Root authority. The utility may return an indication of success or failure which may be tested.

Preferably, each application instance utilizing this third scenario should include configuration information either specifying the dynamic VIPA for use by the IOCTL command or an additional JCL step to invoke the utility to activate the dynamic VIPA. In the event of failure, the recovery mechanism may be the same as that of the second scenario described above.

Having described the present invention with reference to FIG. 1, more detailed operations of the present invention will now be described with reference to FIGS. 2 through 7 which are flowchart illustrations of operations according to embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

Figure 2:
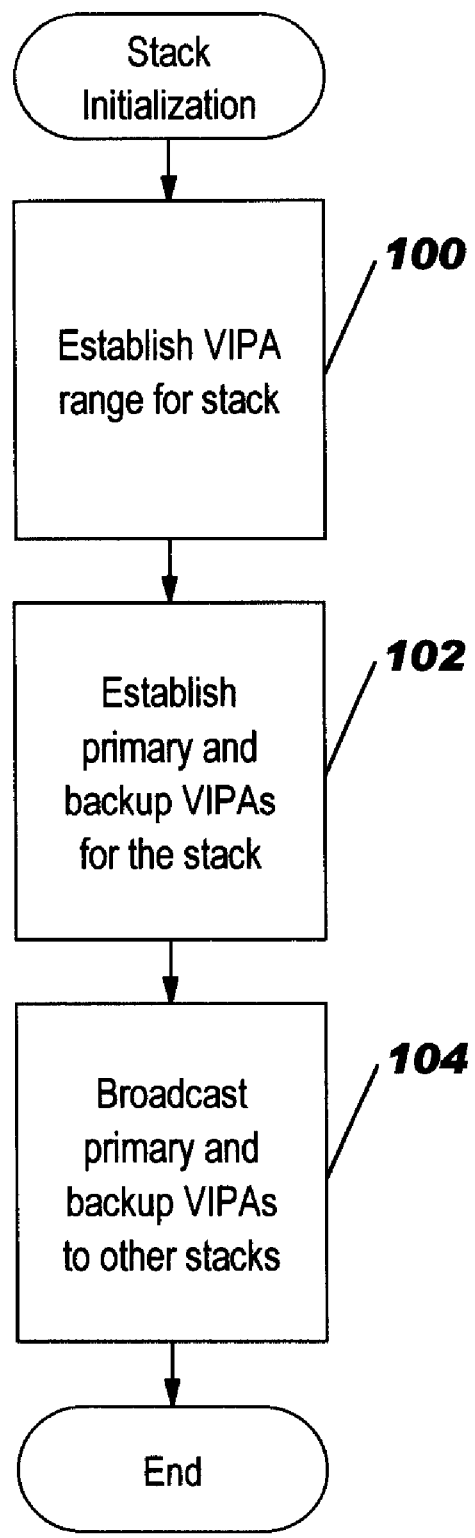
FIG. 2 is a flowchart illustrating operations for initialization of a communication protocol stack incorporating VIPA takeover according to the present invention.

FIG. 2 illustrates operations carried out by one embodiment of the VIPA takeover function 23 during initialization. As seen in FIG. 2, a dynamic VIPA range is established for the communication protocol stack (block 100). As described above, this range may be established through a VIPARange definition in the configuration block of the communication protocol stack. The primary and backup dynamic VIPAs are also established for the communication protocol stack (block 102). The primary and backup dynamic VIPAs may be established, as described above, utilizing the VIPADefine and VIPABackup definitions in the configuration block for the communication protocol stack. After establishing the primary and backup configuration, this information is broadcast to the other communication protocol stacks in the Sysplex 10 utilizing XCF messaging (block 104).

Figure 3:
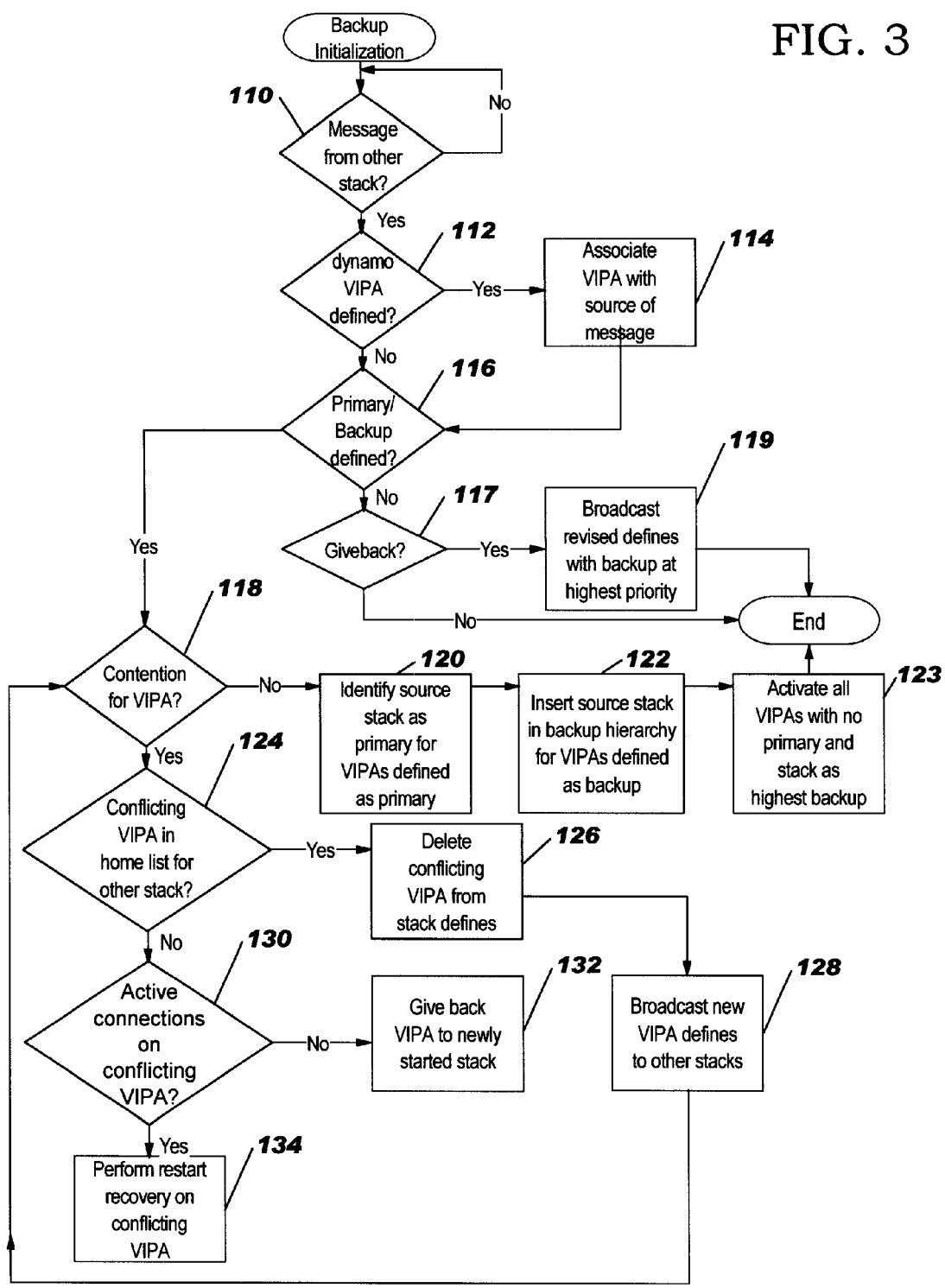
FIG. 3 is a flowchart illustrating operations of a communication protocol stack incorporating VIPA takeover according to the present invention upon receiving a VIPA takeover message from another communication protocol stack.

FIG. 3 illustrates operations of the VIPA takeover function 23 when the VIPA takeover function 23 receives the XCF messages for initialization or modification of the VIPA takeover function 23. As seen in FIG. 3, the VIPA takeover function 23 waits for messages from other communication protocol stacks (block 110). When a message is received, it is determined if the message contains information for activation via bind or IOCTL for a dynamic VIPA within a range for a communication protocol stack (block 112) and if so, then the dynamic VIPA is associated with the source communication protocol stack of the message and that information maintained by the receiving communication protocol stack (block 114).

It is also determined if the message contains primary or backup information about a communication protocol stack (block 116). If so, then it is determined if the primary/backup information causes contention with a dynamic VIPA of the receiving communication protocol stack (block 118). Contention may occur, for example, if the message states that the source communication protocol stack is the primary communication protocol stack for a dynamic VIPA which the receiving communication protocol stack also "owns" as primary.

If there is no contention with the primary/backup definitions then the source communication protocol stack is identified as the primary stack for the dynamic VIPAs defined as primary in the message and the source communication protocol stack is placed at the top of the backup hierarchy for those dynamic VIPAs (block 120). The backup hierarchy may be a list in backup order of the communication protocol stacks associated with a dynamic VIPA. The source communication protocol stack is also identified as the backup stack for the dynamic VIPAs defined as backup in the message and the source communication protocol stack is placed in the backup hierarchy for those dynamic VIPAs based on the priority assigned to the backup (block 122).

Thus, for example, the source communication protocol stack would be placed higher in the list a dynamic VIPA than communication protocols with either lower priority or with the same priority but whose message was received earlier. Thus, contention of backups with the same priority may be resolved by utilizing the most recently received message as the tie breaker for communication protocols with the same priority.

Once the hierarchy for each dynamic VIPA is revised based on the received message, the communication protocol stack determines if there are any dynamic VIPAs which do not have a primary identified and for which the communication protocol stack is the highest backup stack. If so, then the VIPA takeover function 23 activates these dynamic VIPAs on the communication protocol stack (block 123). Thus, a dynamic VIPA may be transferred to a backup stack by the primary stack issuing a message which removes the primary stack as the primary stack for the dynamic VIPA. To activate the dynamic VIPA, the communication protocol stack creates device, link and home statements for the communication protocol stack specifying the dynamic VIPA. The communication protocol stack also notifies the routing daemon through either a BSDROUTINGPARMS entry for ORouteD routing daemons or by sending notification to the routing daemon listening socket for OMPROUTE routing daemons.

Returning to block 118, if contention for a primary dynamic VIPA is detected, then it is determined if the conflicting VIPA is in the home list of another communication protocol stack (block 124).The maintenance of a home list by each communication protocol stack and broadcasting this home list to other communication protocol stacks may be handled utilizing conventional communication protocol stack communications and, therefore, need not be incorporated in the VIPA takeover function 23. If so, then the communication protocol stack receiving the message deletes the conflicting dynamic VIPA from its dynamic VIPA defines (block 126) and broadcasts this change in VIPA definitions to the other communication protocol stacks (block 128). The maintenance of a home list by each communication protocol stack and broadcasting this home list to other communication protocol stacks may be handled utilizing conventional communication protocol stack communications and, therefore, need not be incorporated in the VIPA takeover function 23. However, the VIPA takeover function 23 should have access to the home list information for each communication protocol stack in the Sysplex. If there are more conflicting dynamic VIPAs, then the conflict resolution process is begun again (block 118), otherwise, the operations continue with block 120 as described above.

If the conflicting dynamic VIPA is not in the home list of another communication protocol stack, then it is determined if there are active connections on the conflicting dynamic VIPA on the communication protocol stack receiving the message (block 130). If there are active connections, then the restart recovery operations described with reference to FIG. 7 below are carried out (block 134). If there are more conflicting dynamic VIPAs, then the conflict resolution process is begun again (block 118), otherwise, the operations continue with block 120 as described above.

If there are not connections on the conflicting dynamic VIPA (block 130), then the dynamic VIPA is given back to the communication protocol stack from which the message was received (block 132) and the receiving communication protocol stack reverts to its backup status for the dynamic VIPA and updates its backup hierarchy accordingly. This new status of the receiving communication protocol stack is then broadcast to the other stacks (block 128). If there are more conflicting dynamic VIPAs, then the conflict resolution process is begun again (block 118), otherwise, the operations continue with block 120 as described above.

Returning to block 117, if the message does not contain primary or backup definitions, then it is determined if the message is a delayed giveback message (block 117). As described above, a delayed giveback message would be sent by a communication protocol stack which was going to giveback a dynamic VIPA to a primary communication protocol stack but had to wait for connections to the dynamic VIPA to terminate before the giveback could occur. If the message is a delayed giveback message, then the receiving communication protocol revises it dynamic VIPA definitions to place the dynamic VIPA of the giveback message as a backup with a priority of 255 and broadcasts these new definitions to the other communication protocol stacks (block 119).

Figure 4:
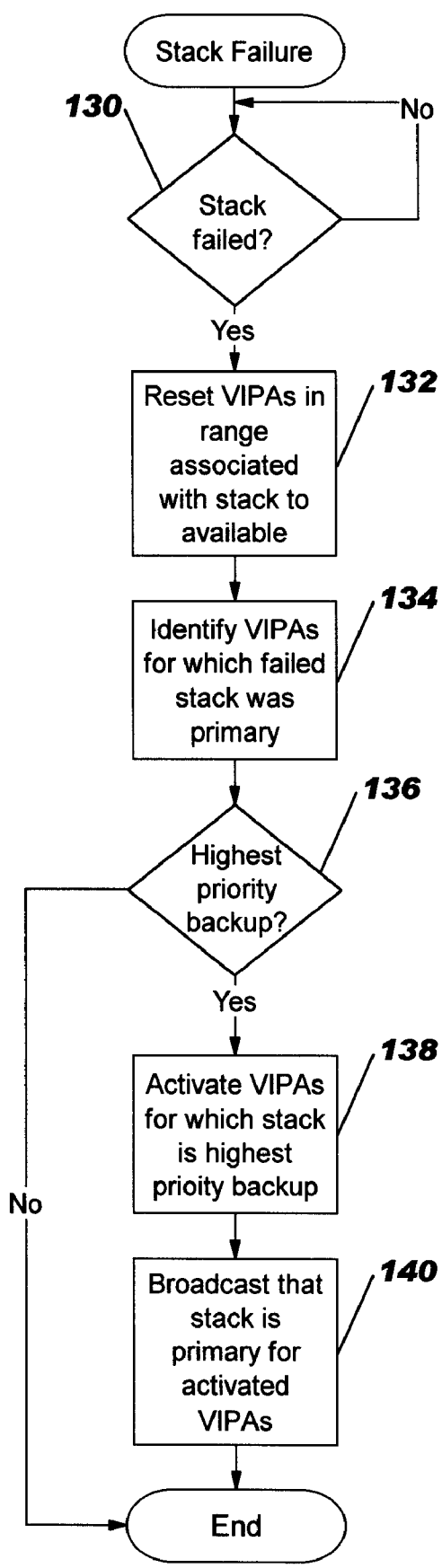
FIG. 4 is a flowchart illustrating operations for recovery from a communication protocol stack failure for a communication protocol stack incorporating VIPA takeover according to the present invention.

FIG. 4 illustrates operations of a VIPA takeover function 23 when notified of a communication protocol stack failure by MVS. As seen in FIG. 4, when a stack failure is detected (block 130), the communication protocol stacks reset the dynamic VIPAs in the range of dynamic VIPAs of the failed communication protocol stack to indicate that the dynamic VIPAs are inactive and, therefore, a BIND( ) to those dynamic VIPAs will be allowed (block 132). The communication protocol stack then identifies the dynamic VIPAs for which the failed communication protocol stack was the primary communication protocol stack (block 134). If the communication protocol stack is not the highest priority backup communication protocol stack for any of the identified dynamic VIPAs (block 136), then no further action need be taken. However, if the communication protocol stack is the highest priority backup communication protocol stack, then the communication protocol stack activates those dynamic VIPAs (block 138). The communication protocol stack then updates its dynamic VIPA definitions to reflect its new status a primary and broadcasts this information to the other communication protocol stacks (block 140).

Figure 5:
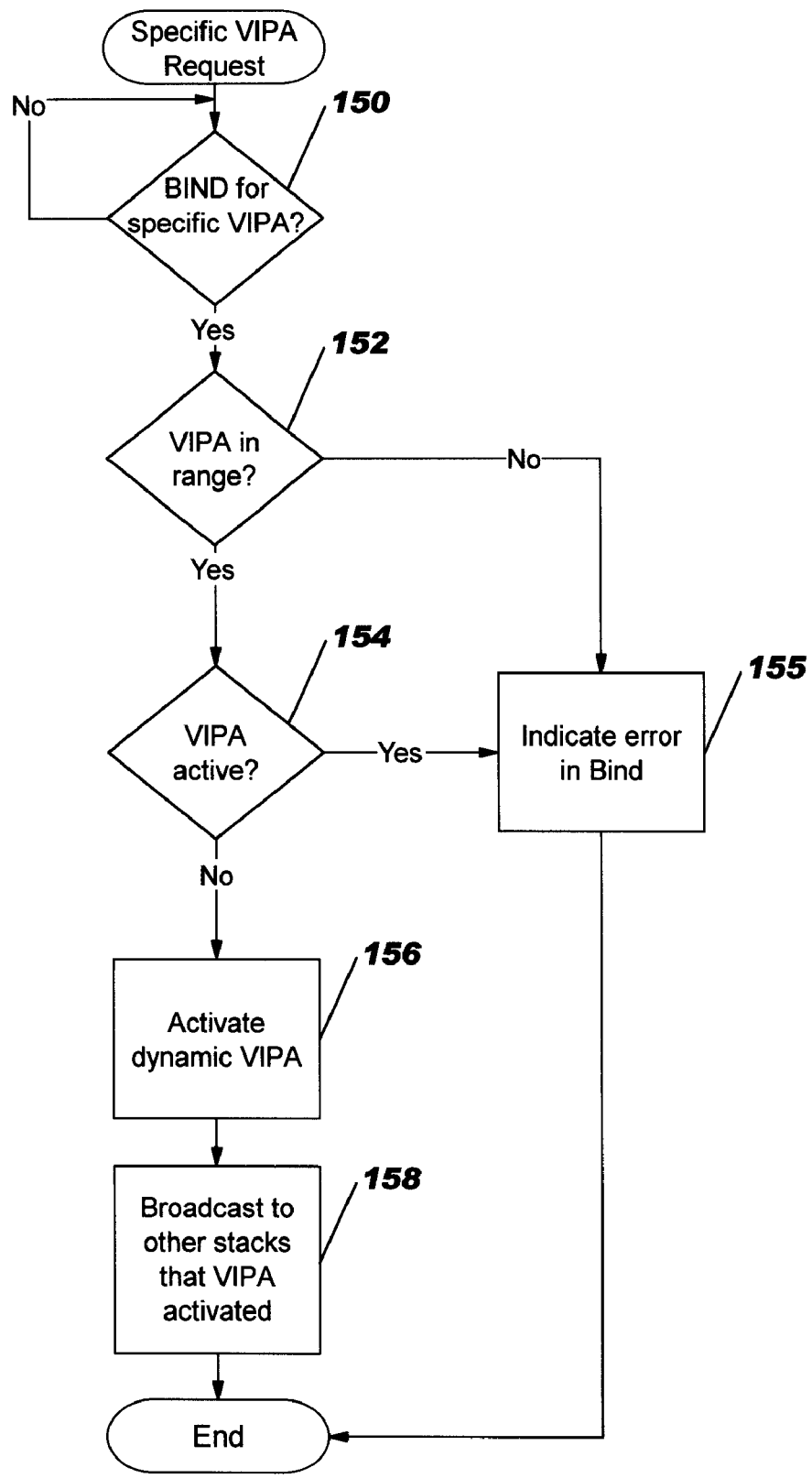
FIG. 5 is a flowchart illustrating operations of a communication protocol stack incorporating VIPA takeover according to the present invention upon receiving a request for a specific dynamic VIPA address.

FIG. 5 illustrates operations carried out by a communication protocol stack when it receives a BIND( ) to a specific dynamic VIPA. When ta BIND( ) to a specific VIPA is received (block 150) it is determined if the requested dynamic VIPA is within the range of dynamic VIPAs specified for the communication protocol stack (block 152). If the requested VIPA is not in the range, then the BIND( ) fails and an error is indicated (block 155). If the requested VIPA is within the range, then it is determined if the dynamic VIPA is active on any other communication protocol stacks (block 154). If so, then an error is also indicated and the BIND( ) fails (block 155). However, if the requested VIPA is within the range of dynamic VIPAs and is not active on another communication protocol stack, then the dynamic VIPA is activated (block 156) and this activation broadcast to the other communication protocol stacks (block 158).

Figure 6:
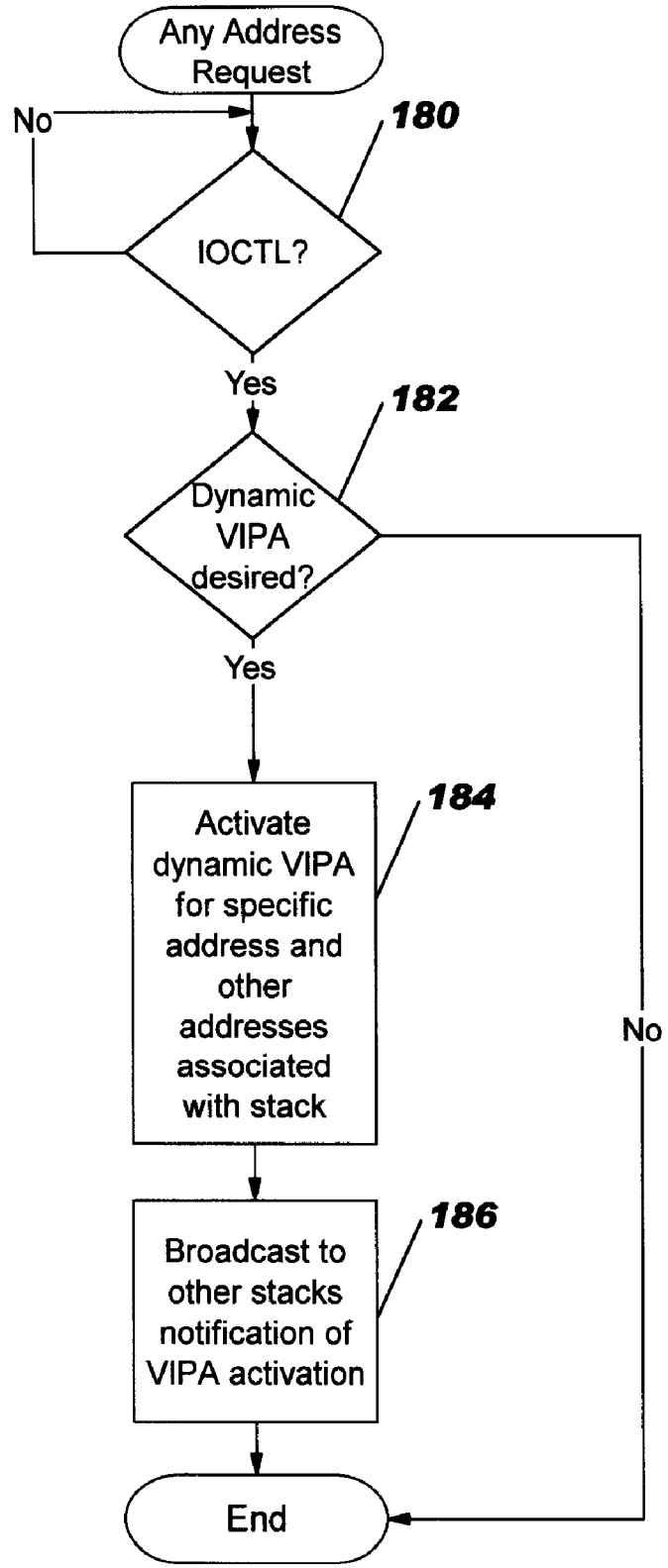
FIG. 6 is a flowchart illustrating operations of a communication protocol stack incorporating VIPA takeover according to the present invention associated with a specific dynamic VIPA address.

FIG. 6 illustrates the operations of the present invention which an application BINDs to any IP address but where an operator, JCL or other mechanism also utilizes the IOCTL command described above to activate a dynamic VIPA associated with the application. As seen in FIG. 6, when an IOCTL is received (block 180) it is determined if a specific dynamic VIPA is to be associated with the application (block 182). If so, then the dynamic VIPA is activated (block 184) and this activation broadcast to the other communication protocol stacks (block 186). Note that the activation of the dynamic VIPA in the present case occurs irrespective of whether the dynamic VIPA is active on other communication protocol stacks. If the dynamic VIPA is active on other communication protocol stacks, the dynamic VIPA will be deleted from the other communication protocol stacks as described above.

Figure 7:
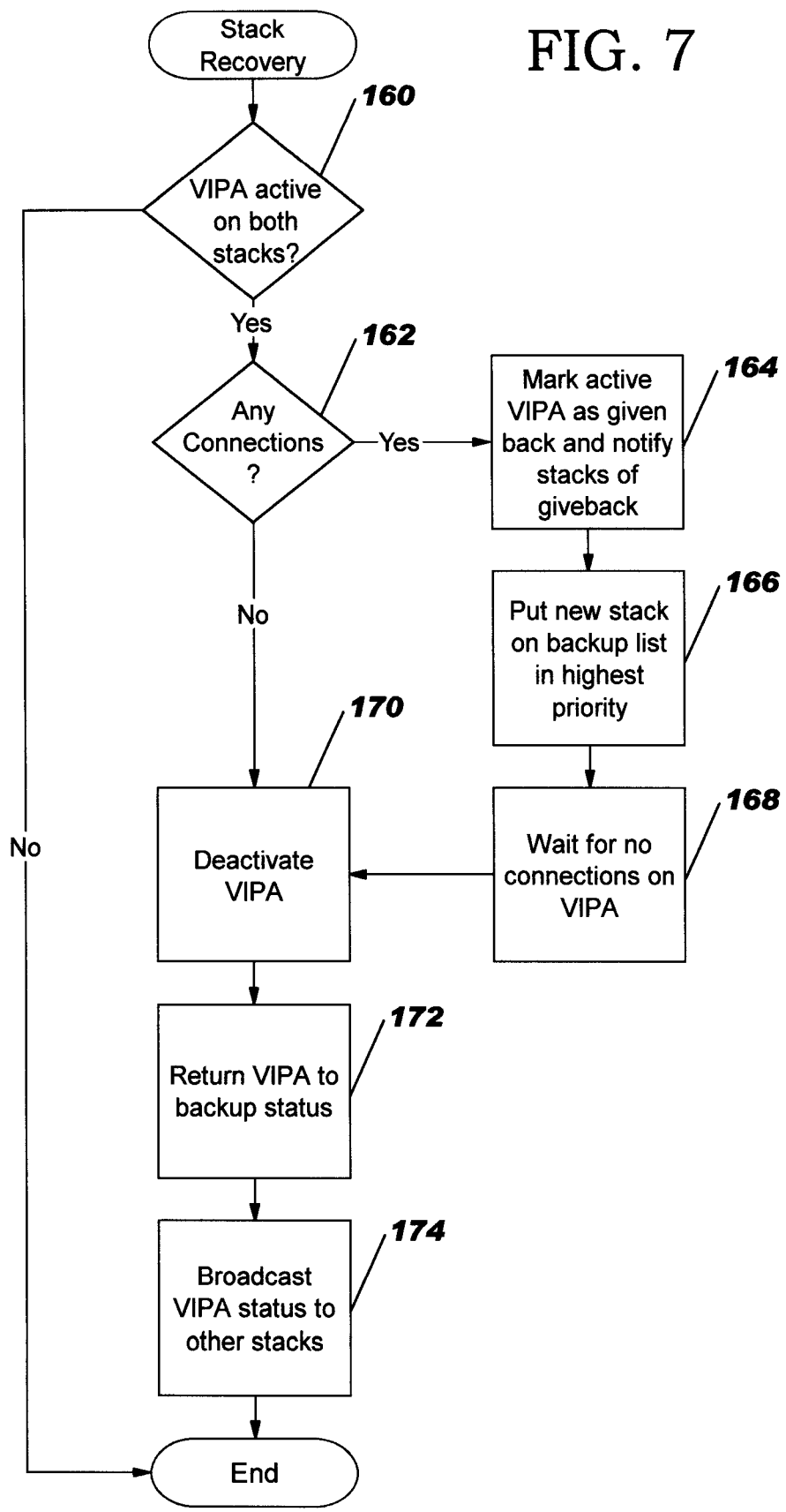
FIG. 7 is a flowchart illustrating operations of a communication protocol stack incorporating VIPA takeover according to the present invention upon recovery of a failed communication protocol stack.

FIG. 7 illustrates operations of the VIPA takeover function 23 when a failed communication protocol stack is recovered. As briefly described above with reference to FIG. 3, the operations of FIG. 7 may take place as a result of contention between definitions of primary communication protocol stacks for a dynamic VIPA. Thus, as seen at block 160, if a dynamic VIPA is active at two communication protocol stacks, then it is determined if there are any active connections to the dynamic VIPA at the communication protocol stack which received the message indicating that another communication protocol stack was the primary communication protocol stack for a dynamic VIPA (block 162). If there are active connections, then the dynamic VIPA id marked as given back and the other communication protocol stacks notified of this delayed giveback status (block 164). The new primary communication protocol stack is also placed on the backup list at the highest priority as a result of the new communication protocol stack broadcasting a new backup definition responsive to receiving the delayed giveback message (block 166). The communication protocol stack which is giving back the dynamic VIPA then waits until there are no more connections to the dynamic VIPA (block 168).

When there are no connections to the dynamic VIPA (block 168), or if there originally were no connections to the dynamic VIPA (block 162), the dynamic VIPA is deactivated (block 170) and returned to backup status (block 172). The new status of the dynamic VIPA for the communication protocol stack is then broadcast to the other communication protocol stacks (block 174). As a result, when the communication protocol stack which originally broadcast the message which resulted in the contention for the dynamic VIPA receives the message that the dynamic VIPA has been returned to backup status, because this originating communication protocol stack is the highest priority backup stack, it will assume primary ownership of the dynamic VIPA and then broadcast a message to reflect this change in status (see e.g. FIG. 3, block 123).

Figure 8:
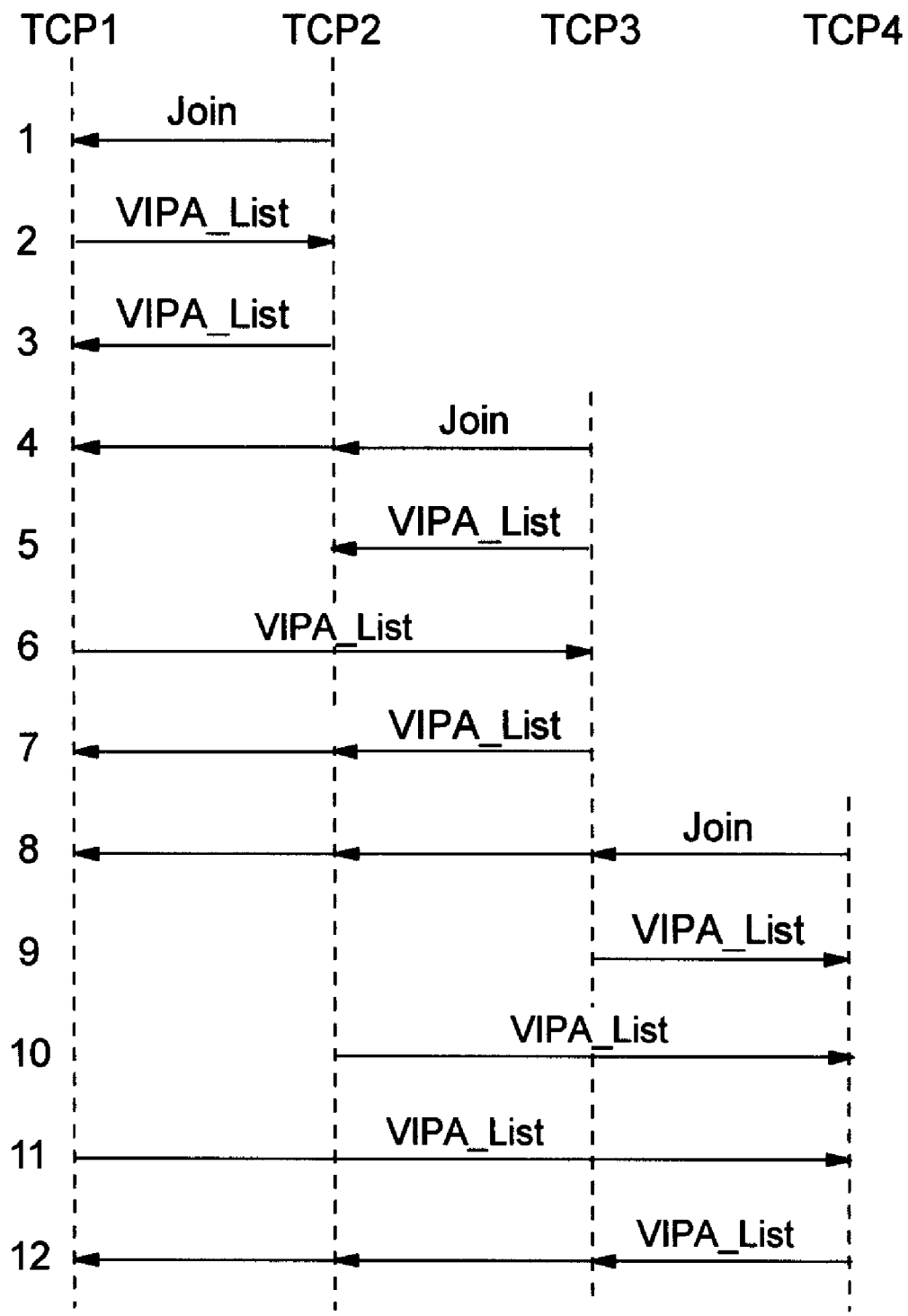
FIG. 8 is a flow diagram illustrating an example communication sequence for initialization of communication protocol stacks incorporating VIPA takeover according to the present invention.
Figure 9:
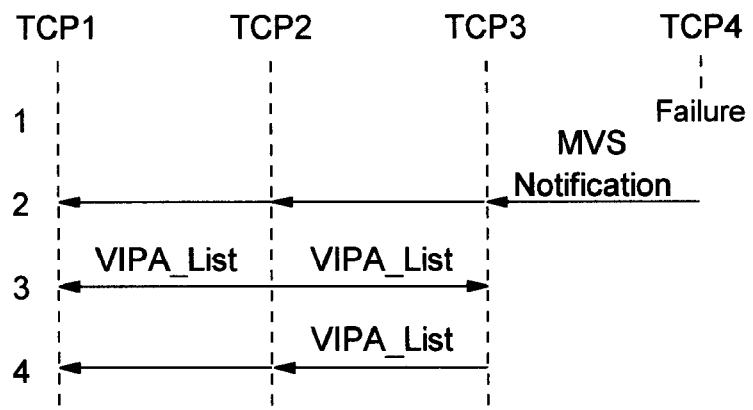
FIG. 9 is a flow diagram illustrating an example communication sequence upon failure of a communication protocol stack incorporating VIPA takeover according to the present invention.
Figure 10:
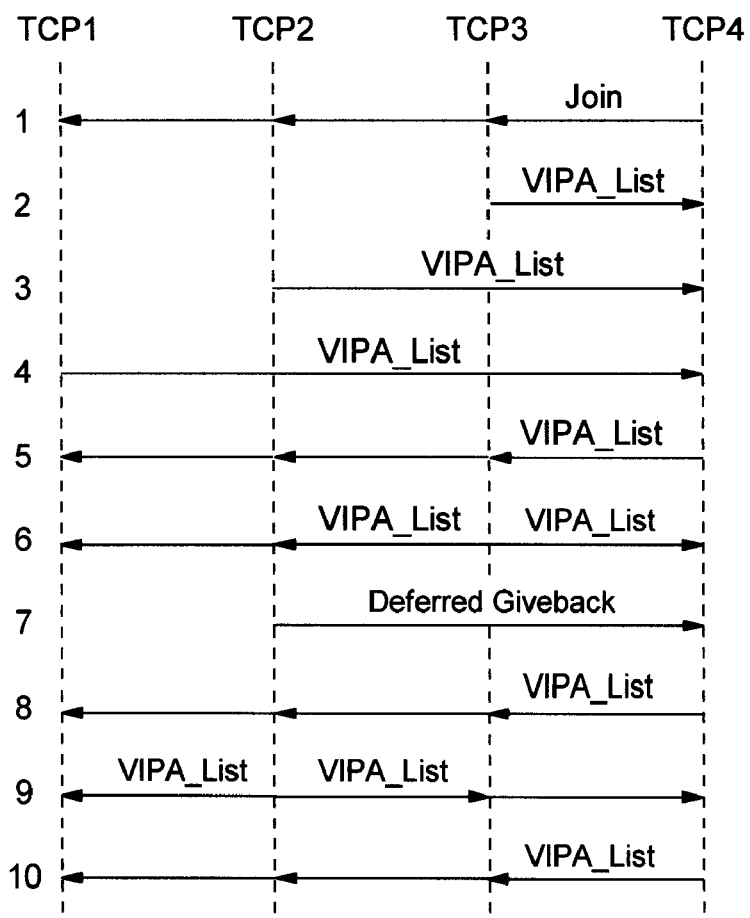
FIG. 10 is a flow diagram illustrating an example communication sequence upon recover of a failed communication protocol stack incorporating VIPA takeover according to the present invention.

FIGS. 8 through 10 are flow diagrams illustrating example communications between communication protocol stacks utilizing the present invention. FIG. 8 is a flow diagram of the communications for initialization between four TCP stacks (TCP1 through TCP4) incorporating VIPA takeover function 23. As seen in FIG. 8, TCP1 is the first initialized TCP stack. Thus, at time 1, the following example hierarchy for dynamic VIPAs V1 through V8 may exist:

V1
TCP1, Time-1, Active
V2
TCP1, Time-1, Active
V3
TCP1, Time-1, Backup (10)
V4
V5
TCP1, Time-1, Backup (10)
V6
V7
TCP1, Time-1, Backup (10)
V8
TCP1, Time-1, Backup (10)

At time 1, TCP2 joins the TCP XCF group of TCP stacks and TCP1 is notified of the join. In response to the Join notification, at time 2, TCP1 transmits its VIPA definitions (VIPA_List) to TCP2, which, also transmits its VIPA_List to TCP 1 at time 3. As a result, the VIPA hierarchy in TCP1 and TCP2 will be:

V1
TCP1, Time-1, Active
TCP2, Time-2, Backup (20)
V2
TCP1, Time-1, Active
TCP2, Time-2, Backup (20)
V3
TCP2, Time-2, Active
TCP1, Time-1, Backup (10)
V4
TCP2, Time-2, Active
V5
TCP1, Time 1, Backup (10)
V6
TCP2, Time-2, Backup (20)
V7
TCP2, Time-2, Backup (20)
TCP1, Time-1, Backup (10)
V8
TCP1, Time-1, Backup (10)

At time 4, TCP3 has been initialized sufficiently to join the TCP XCF group and, therefore, TCP2 and TCP1 are notified of the join. In response to the Join, TCP2 at time 5 sends its VIPA_List to TCP3 and TCP1 at time 6 sends its VIPA_List to TCP3. In response, TCP3 broadcasts its VIPA_List to TCP1 and TCP2. As a result, the VIPA hierarchy in TCP1, TCP2 and TCP3 will be:

V1
TCP1, Time-1, Active
TCP2, Time-2, Backup (20)
V2
TCP1, Time-1, Active
TCP3, Time-3, Backup (30)
TCP2, Time-2, Backup (20)
V3
TCP2, Time-2, Active
TCP3, Time-3, Backup (30)
TCP1, Time-1, Backup (10)
V4
TCP2, Time-2, Active
TCP3, Time-3, Backup (30)
V5
TCP3, Time-3, Active
TCP1, Time 1, Backup (10)
V6
TCP3, Time-3, Active
TCP2, Time-2, Backup (20)
V7
TCP2, Time-2, Backup (20)
TCP1, Time-1, Backup (10)
V8
TCP3, Time-3, Backup (30)
TCP1, Time-1, Backup (10)

At time 8, TCP4 has been initialized sufficiently to join the TCP XCF group and, therefore, TCP3, TCP2 and TCP1 are notified of the join. In response to the Join, TCP3 at time 9 sends its VIPA_List to TCP4, TCP2 at time 10 sends its VIPA_List to TCP4 and TCP1 at time 11 sends its VIPA_List to TCP4. In response, TCP4 broadcasts its VIPA_List to TCP1, TCP2 and TCP3. As a result, the VIPA hierarchy in TCP1, TCP2, TCP3 and TCP4 will be:

V1
  TCP1, Time-1, Active
  TCP2, Time-2, Backup (20)
V2
  TCP1, Time-1, Active
  TCP3, Time-3, Backup (30)
  TCP2, Time-2, Backup (20)
V3
  TCP2, Time-2, Active
  TCP3, Time-3, Backup (30)
  TCP1, Time-1, Backup (10)
V4
  TCP2, Time-2, Active
  TCP3, Time-3, Backup (30)
V5
  TCP3, Time-3, Active
  TCP1, Time 1, Backup (10)
V6
  TCP3, Time-3, Active
  TCP2, Time-2, Backup (20)
V7
  TCP4, Time-4, Active
  TCP2, Time-2, Backup (20)
  TCP1, Time-1, Backup (10)
V8
  TCP4, Time-4, Active
  TCP3, Time-3, Backup (30)
  TCP1, Time-1, Backup (10)

Thus, after distributing each TCP stack's VIPA_List to the other TCP stacks, each stack should have the same backup hierarchy.

FIG. 9 illustrates to the communication flows when a TCP stack, such as TCP4, fails. As seen in FIG. 9, after time 1, TCP4 fails. At time 2, MVS notifies TCP1, TCP2 and TCP3 of the failure of failure. Each of the remaining TCP stacks remove the dynamic VIPAs associated with TCP4 from the hierarchy. Because TCP1 is not the highest priority backup for the active dynamic VIPAs V7 and V8 on TCP4, after removing references to TCP4 from the hierarchy TCP1 takes no further action until new VIPA_Lists are received from TCP2 and TCP3. Because TCP2 is the highest priority backup for V7, TCP2 activates V7 and at time 3 sends a revised VIPA_List reflecting this activation to TCP1 and TCP3. TCP3 also determines that it is the highest priority backup for dynamic VIPA V8 and, therefore, activates V8 and at time 4 sends a revised VIPA_List to TCP1 and TCP2. As a result of TCP4's failure, after the takeover of the VIPAs for which TCP4 was active has occurred, the hierarchy will be as follows:

V1
  TCP1, Time-1, Active
  TCP2, Time-2, Backup (20)
V2
  TCP1, Time-1, Active
  TCP3, Time-3, Backup (30)
  TCP2, Time-2, Backup (20)
V3
  TCP2, Time-2, Active
  TCP3, Time-3, Backup (30)
  TCP1, Time-1, Backup (10)
V4
  TCP2, Time-2, Active
  TCP3, Time-3, Backup (30)
V5
  TCP3, Time-3, Active
  TCP1, Time 1, Backup (10)
V6
  TCP3, Time-3, Active
  TCP2, Time-2, Backup (20)
V7
  TCP2, Time-5, Active
  TCP1, Time-1, Backup (10)
V8
  TCP3, Time-6, Active
  TCP1, Time-1, Backup (10)

Thus as reflected in the hierarchy, TCP3 will be active for V8 and TCP2 will be active for V7.

FIG. 10 illustrates to the communication flows when a TCP stack which has previously failed, such as TCP4, is recovered. As seen in FIG. 10, at time 1, TCP4 is recovered sufficiently to join the XCF group and TCP1, TCP2 and TCP3 are notified of this join. Thus, at time 2 TCP3 sends its VIPA_List to TCP4, at time 3, TCP2 sends its VIPA_List to TCP4 and at time 4, TCP1 sends its VIPA_List to TCP4. At time 5, TCP4 broadcasts it VIPA_List to TCP1, TCP2 and TCP3. When TCP3 receives the VIPA_List from TCP4, it determines that TCP wants to own V8 which is currently owned by TCP3. Since there are not active connections to V8 at TCP3, TCP3 deletes V8 and broadcasts, at time 6, its VIPA_List identify itself as a backup for V8.

TCP2 also evaluates the VIP_List from TCP4 and determines that TCP4 wants ownership of V7. However, because active connections exist to V7 at TCP2, TCP2, at time 7, sends a deferred giveback message to TCP4 notifying TCP4 that TCP2 will give back V7 when there are no active connections to V7. In response, at time 8, TCP4 re-broadcasts its VIPA_List identifying itself as the highest priority backup for V7. At time 9 there are no longer active connections to V7 at TCP2 so TCP2 deletes V7 and broadcasts its VIPA_List indicating that TCP2 is a backup for V7. When TCP4 received the VIPA_List from TCP2 it recognizes that there is no longer an active TCP stack for V7 and, because it is the highest priority backup, activates V7 and then re-broadcasts, at time 10, its VIPA_List reflecting the activation of V7. As a result, the hierarchy maintained at each TCP stack will revert to that before the failure of TCP4.

While the present invention has been described with respect to the VIPA takeover function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in an OS/390 environment, as will be appreciated by those of skill in the art, the present invention may be embodied in other environments and should not be construed as limited to OS/390 but may be incorporated into other systems, such as a Unix or other environments by associating applications or groups of applications with an address rather than a communications adapter. Thus, the present invention may be suitable for use in any collection of data processing systems which allow sufficient communication to all of for the use of dynamic virtual addressing. Accordingly, specific references to OS/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What which is claimed is:

1. A method of transferring a Virtual IP Address (VIPA) from a first application instance to a second application instance, wherein the first application instance and the second application instance are executing on a cluster of data processing systems having a plurality of communication protocol stacks associated therewith and wherein the first application instance is associated with a first of the plurality of communication protocol stacks and the second application instance is associated with a second of the plurality of communication protocol stacks, the method comprising the steps of:

distributing among the plurality of communication protocol stacks a list of dynamic VIPAs, wherein a hierarchy of backup communication protocol stacks for the dynamic VIPAs in the list of dynamic VIPAs is determined based on the list of dynamic VIPAs;

receiving notification of failure of the first communication protocol stack at the second of the plurality of communication protocol stacks;

evaluating the hierarchy of backup communication protocol stacks to determine if the second of the plurality of communication protocol stacks is a next communication protocol stack of the plurality of communications after the first of the plurality of communication protocol stacks in the hierarchy of backup communication protocol stacks for the VIPA associated with the first application instance; and transferring the VIPA associated with the first application instance to the second of the plurality of communication protocol stacks associated with the second application instance if the list of dynamic VIPAs identifies the second of the plurality of communication protocol stacks as the next communication protocol stack of the plurality of communications after the first of the plurality of communication protocol stacks in the hierarchy of backup communication protocol stacks for the VIPA associated with the first application instance.

2. A method according to claim 1, wherein the step of distributing comprises the step of broadcasting from a communication protocol stack supporting dynamic VIPAs, a VIPA define message which provides identification of active dynamic VIPAs associated with the broadcasting communication protocol stack and which provides identification of dynamic VIPAs for which the broadcasting communication protocol stack is a backup communication protocol stack.

3. A method according to claim 2, wherein the VIPA define message further comprises a priority associated with the dynamic VIPAs for which the broadcasting communication protocol stack is a backup communication protocol stack.

4. A method according to claim 3, further comprising the steps of:

receiving a broadcast VIPA define message;

establishing for each VIPA in the VIPA define message a list of communication protocol stacks associated with the VIPA so as to provide a list of the hierarchy of backup communication protocol stacks associated with the VIPA.

5. A method according to claim 4, wherein the list of communications protocol stacks is in the order of priority of the communication protocol stacks.

6. A method according to claim 4, further comprising the steps of:

determining if the received broadcast VIPA define message defines a communication protocol stack as a primary communication protocol stack for a dynamic VIPA identified as an active dynamic VIPA at the communication protocol stack receiving the VIPA define message; and deleting the active dynamic VIPA at the receiving communication protocol stack if the received broadcast VIPA define message defines a communication protocol stack as a primary communication protocol stack for a dynamic VIPA identified as an active dynamic VIPA at the communication protocol stack receiving the VIPA define message.

7. A method according to claim 6, wherein the deleting step is preceded by the step of determining if an active connection exists to the active dynamic VIPA, and wherein the step of deleting the active dynamic VIPA is delayed if an active connection exists until there are no connections to the active dynamic VIPA.

8. A method according to claim 7, wherein the deleting step is preceded by the steps of:

broadcasting a VIPA delayed giveback message so as to notify other communication protocol stacks of the plurality of communication protocol stacks that the communication protocol stacks which received the VIPA define message will delete the active dynamic VIPA when there are no connections to the active dynamic VIPA; and broadcasting from the communication protocol stack which transmitted the VIPA define message, responsive to receiving the VIPA delayed giveback message, a VIPA define message identifying the communication protocol stack which transmitted the VIPA define message as a backup protocol stack for the active dynamic VIPA having a highest priority.

9. A method according to claim 1, further comprising the steps of:

receiving, at the second of the plurality of communication protocol stacks, notification of the restart of the first of the plurality of communication protocol stacks;

determining if the first of the plurality of communication protocol stacks is the primary communication protocol stack associated with an active dynamic VIPA of the second of the plurality of communication protocol stacks;

deleting the active dynamic VIPA if the first of the plurality of communication protocol stacks is the primary communication protocol stack associated with the dynamic VIPA; and broadcasting from the second of the plurality of communication protocol stacks, responsive to deleting the active dynamic VIPA, a VIPA define message identifying the second of the plurality of communication protocol stacks as a backup protocol stack for the active dynamic VIPA.

10. A method according to claim 9, wherein the deleting step is preceded by the step of determining if an active connection exists to the active dynamic VIPA of the second of the plurality of communication protocol stacks, and wherein the step of deleting the active dynamic VIPA is delayed if an active connection exists until there are no connections to the active dynamic VIPA.

11. A method according to claim 10, further comprising the steps of:
transmitting from the second communication protocol stack to the first of the plurality of communication protocol stacks a VIPA delayed giveback message so as to notify the first of the plurality of communication protocol stacks that the second of the plurality of communication protocol stacks will delete the active dynamic VIPA when there are no connections to the active dynamic VIPA; and
broadcasting from the first of the plurality of communication protocol stacks, responsive to receiving the VIPA delayed giveback message, a VIPA define message identifying the first of the plurality of communication protocol stacks as a backup protocol stack for the active dynamic VIPA having a highest priority.

12. A method according to claim 1, further comprising the steps of:
establishing a range of dynamic VIPAs associated with the first and the second of the plurality of communication protocol stacks;
distributing among the plurality of communication protocol stacks information as to a bind status of dynamic VIPAs associated with communication protocol stacks of the plurality of communication protocol stacks so as to allow communication protocol stacks in the plurality of communication protocol stacks to determine if a dynamic VIPA has been bound to an application instance;
receiving notification of failure of the first of the plurality of communication protocol stacks at the second of the plurality of communication protocol stacks;
resetting the bind status of dynamic VIPAs bound to the first of the plurality of communication protocol stacks so as to allow bind calls to the dynamic VIPAs bound to the first of the plurality of communication protocol stack;
receiving at the second of the plurality of communication protocol stacks a request to bind the second instance of the application with a specified dynamic VIPA of the first application instance; and
binding the second application instance to the specified dynamic VIPA at the second communication protocol stack so as to allow communications to the second application instance through the second communication protocol stack utilizing the first VIPA.

13. A method according to claim 12, wherein dynamic VIPAs in the range of dynamic VIPAs associated with communication protocol stacks of the plurality of communication protocol stacks and dynamic VIPAs in the list of dynamic VIPAs are mutually exclusive.

14. A method according to claim 12, wherein the request to bind the second application to the specified dynamic VIPA at the second of the plurality of communication protocol stacks is a BIND call which specifies the specified dynamic VIPA.

15. A method according to claim 12, further comprising the steps of:
determining if the specified dynamic VIPA is active on a communication protocol stack of the plurality of communication protocol stacks other than the second of the plurality of communication protocol stacks; and
rejecting the bind request from the second instance of the application if the specified dynamic VIPA is active on a communication protocol stack of the plurality of communication protocol stacks other than the second of the plurality of communication protocol stacks.

16. A method according to claim 12, further comprising the step of notifying the plurality of communication protocol stacks that the specified dynamic VIPA is active at the second of the plurality of communication protocol stacks.

17. A method according to claim 12, wherein the request to bind the second application to the specified dynamic VIPA at the second of the plurality of communication protocol stacks is an IOCTL command which specifies the specified dynamic VIPA.

18. A method according to claim 17, further comprising the steps of:
receiving at the second of the plurality of communication protocol stacks a BIND call specifying that the second instance of the application can bind to any valid address at the second of the plurality of communication protocol stacks; and
binding the second instance of the application to any valid address at the second of the plurality of communication protocol stacks.

19. A method according to claim 17, further comprising the steps of:
activating the specified dynamic VIPA on the second of the plurality of communication protocol stacks irrespective of whether the specified dynamic VIPA is active a communications protocol stack other than the second of the plurality of communication protocol stacks; and
deleting the specified dynamic VIPA from all communication protocol stacks other than the second of the plurality of communication protocol stacks.

20. A method of transferring a Virtual IP Address (VIPA) from a first application instance to a second application instance, wherein the first application instance and the second application instance are executing on a cluster of data processing systems having a plurality of communication protocol stacks associated therewith and wherein the first application instance is bound to a first VIPA associated with a first of the plurality of communication protocol stacks and wherein the second application instance is a restarted instance of the first application associated with a second of the plurality of communication protocol stacks, the method comprising the steps of:
establishing a range of dynamic VIPAs associated with a communication protocol stack of the plurality of communication protocol stacks;
distributing among the plurality of communication protocol stacks information as to a bind status of dynamic VIPAs associated with communication protocol stacks of the plurality of communication protocol stacks so as to allow communication protocol stacks in the plurality of communication protocol stacks to determine if a dynamic VIPA has been bound to an application instance;
receiving notification of failure of the first communication protocol stack at the second of the plurality of communication protocol stacks;

resetting the bind status of dynamic VIPAs bound to the first communication protocol stack so as to allow bind calls to the dynamic VIPAs bound to the first communication protocol stack;

receiving at the second communication protocol stack a request to bind the second instance of the application with the first VIPA of the first application instance; and binding the second application instance to the first VIPA at the second communication protocol stack so as to allow communications to the second application instance through the second communication protocol stack utilizing the first VIPA.

21. A method according to claim 20, wherein the request to bind the second application to the first VIPA at the second of the plurality of communication protocol stacks is a BIND call which specifies the first VIPA.

22. A method according to claim 20, further comprising the steps of:

determining if the first VIPA is active on a communication protocol stack of the plurality of communication protocol stacks other than the second of the plurality of communication protocol stacks; and rejecting the bind request from the second instance of the application if the first VIPA is active on a communication protocol stack of the plurality of communication protocol stacks other than the second of the plurality of communication protocol stacks.

23. A method according to claim 20, further comprising the step of notifying the plurality of communication protocol stacks that the first VIPA is active at the second of the plurality of communication protocol stacks.

24. A method according to claim 20, wherein the request to bind the second application to the first VIPA at the second of the plurality of communication protocol stacks is an IOCTL command which specifies the first VIPA.

25. A method according to claim 24, further comprising the steps of:

receiving at the second of the plurality of communication protocol stacks a BIND call specifying that the second instance of the application can bind to any valid address at the second of the plurality of communication protocol stacks; and binding the second instance of the application to any valid address at the second of the plurality of communication protocol stacks.

26. A method according to claim 24, further comprising the steps of:

activating the first VIPA on the second of the plurality of communication protocol stacks irrespective of whether the first VIPA is active a communications protocol stack other than the second of the plurality of communication protocol stacks; and deleting the first VIPA from all communication protocol stacks other than the second of the plurality of communication protocol stacks.

27. A system for transferring a Virtual IP Address (VIPA) from a first application instance to a second application instance, wherein the first application instance and the second application instance are executing on a cluster of data processing systems having a plurality of communication protocol stacks associated therewith and wherein the first application instance is associated with a first of the plurality of communication protocol stacks and the second application instance is associated with a second of the plurality of communication protocol stacks, comprising:

means for distributing among the plurality of communication protocol stacks a list of dynamic VIPAs, wherein a hierarchy of backup communication protocol stacks for the dynamic VIPAs in the list of dynamic VIPAs is determined based on the list of dynamic VIPAs;

means for receiving notification of failure of the first communication protocol stack at the second of the plurality of communication protocol stacks;

means for evaluating the hierarchy of backup communication protocol stacks to determine if the second of the plurality of communication protocol stacks is a next communication protocol stack of the plurality of communications after the first of the plurality of communication protocol stacks in the hierarchy of backup communication protocol stacks for the VIPA associated with the first application instance; and means for transferring the VIPA associated with the first application instance to the second of the plurality of communication protocol stacks associated with the second application instance if the list of dynamic VIPAs identifies the second of the plurality of communication protocol stacks as the next communication protocol stack of the plurality of communications after the first of the plurality of communication protocol stacks in the hierarchy of backup communication protocol stacks for the VIPA associated with the first application instance.

28. A system according to claim 27, further comprising:

means for establishing a range of dynamic VIPAs associated with the first and the second of the plurality of communication protocol stacks;

means for distributing among the plurality of communication protocol stacks information as to a bind status of dynamic VIPAs associated with communication protocol stacks of the plurality of communication protocol stacks so as to allow communication protocol stacks in the plurality of communication protocol stacks to determine if a dynamic VIPA has been bound to an application instance;

means for receiving notification of failure of the first of the plurality of communication protocol stacks at the second of the plurality of communication protocol stacks;

means for resetting the bind status of dynamic VIPAs bound to the first of the plurality of communication protocol stacks so as to allow bind calls to the dynamic VIPAs bound to the first of the plurality of communication protocol stack;

means for receiving at the second of the plurality of communication protocol stacks a request to bind the second instance of the application with a specified dynamic VIPA of the first application instance; and means for binding the second application instance to the specified dynamic VIPA at the second communication protocol stack so as to allow communications to the second application instance through the second communication protocol stack utilizing the first VIPA.

29. A system for transferring a Virtual IP Address (VIPA) from a first application instance to a second application instance, wherein the first application instance and the second application instance are executing on a cluster of data processing systems having a plurality of communication protocol stacks associated therewith and wherein the first application instance is bound to a first VIPA associated with a first of the plurality of communication protocol stacks and wherein the second application instance is a restarted instance of the first application associated with a second of the plurality of communication protocol stacks, comprising:

means for establishing a range of dynamic VIPAs associated with a communication protocol stack of the plurality of communication protocol stacks;

means for distributing among the plurality of communication protocol stacks information as to a bind status of dynamic VIPAs associated with communication protocol stacks of the plurality of communication protocol stacks so as to allow communication protocol stacks in the plurality of communication protocol stacks to determine if a dynamic VIPA has been bound to an application instance;

means for receiving notification of failure of the first communication protocol stack at the second of the plurality of communication protocol stacks;

means for resetting the bind status of dynamic VIPAs bound to the first communication protocol stack so as to allow bind calls to the dynamic VIPAs bound to the first communication protocol stack;

means for receiving at the second communication protocol stack a request to bind the second instance of the application with the first VIPA of the first application instance; and means for binding the second application instance to the first VIPA at the second communication protocol stack so as to allow communications to the second application instance through the second communication protocol stack utilizing the first VIPA.

30. A computer program product for transferring a Virtual IP Address (VIPA) from a first application instance to a second application instance, wherein the first application instance and the second application instance are executing on a cluster of data processing systems having a plurality of communication protocol stacks associated therewith and wherein the first application instance is associated with a first of the plurality of communication protocol stacks and the second application instance is associated with a second of the plurality of communication protocol stacks, comprising:

a computer readable storage medium having computer readable program code embodied in said medium, said computer readable program code comprising:

computer readable program code for distributing among the plurality of communication protocol stacks a list of dynamic VIPAs, wherein a hierarchy of backup communication protocol stacks for the dynamic VIPAs in the list of dynamic VIPAs is determined based on the list of dynamic VIPAs;

computer readable program code for receiving notification of failure of the first communication protocol stack at the second of the plurality of communication protocol stacks;

computer readable program code for evaluating the hierarchy of backup communication protocol stacks to determine if the second of the plurality of communication protocol stacks is a next communication protocol stack of the plurality of communications after the first of the plurality of communication protocol stacks in the hierarchy of backup communication protocol stacks for the VIPA associated with the first application instance; and computer readable program code for transferring the VIPA associated with the first application instance to the second of the plurality of communication protocol stacks associated with the second application instance if the list of dynamic VIPAs identifies the second of the plurality of communication protocol stacks as the next communication protocol stack of the plurality of communications after the first of the plurality of communication protocol stacks in the hierarchy of backup communication protocol stacks for the VIPA associated with the first application instance.

31. A computer program product according to claim 30, further comprising:

computer readable program code for establishing a range of dynamic VIPAs associated with the first and the second of the plurality of communication protocol stacks;

computer readable program code for distributing among the plurality of communication protocol stacks information as to a bind status of dynamic VIPAs associated with communication protocol stacks of the plurality of communication protocol stacks so as to allow communication protocol stacks in the plurality of communication protocol stacks to determine if a dynamic VIPA has been bound to an application instance;

computer readable program code for receiving notification of failure of the first of the plurality of communication protocol stacks at the second of the plurality of communication protocol stacks;

computer readable program code for resetting the bind status of dynamic VIPAs bound to the first of the plurality of communication protocol stacks so as to allow bind calls to the dynamic VIPAs bound to the first of the plurality of communication protocol stack;

computer readable program code for receiving at the second of the plurality of communication protocol stacks a request to bind the second instance of the application with a specified dynamic VIPA of the first application instance; and computer readable program code for binding the second application instance to the specified dynamic VIPA at the second communication protocol stack so as to allow communications to the second application instance through the second communication protocol stack utilizing the first VIPA.

32. A computer program product for transferring a Virtual IP Address (VIPA) from a first application instance to a second application instance, wherein the first application instance and the second application instance are executing on a cluster of data processing systems having a plurality of communication protocol stacks associated therewith and wherein the first application instance is bound to a first VIPA associated with a first of the plurality of communication protocol stacks and wherein the second application instance is a restarted instance of the first application associated with a second of the plurality of communication protocol stacks, comprising:

a computer readable storage medium having computer readable program code embodied in said medium, said computer readable program code comprising:

computer readable program code for establishing a range of dynamic VIPAs associated with a communication protocol stack of the plurality of communication protocol stacks;

computer readable program code for distributing among the plurality of communication protocol stacks information as to a bind status of dynamic VIPAs associated with communication protocol stacks of the plurality of communication protocol stacks so as to allow communication protocol stacks in the plurality of communication protocol stacks to determine if a dynamic VIPA has been bound to an application instance;

computer readable program code for receiving notification of failure of the first communication protocol stack at the second of the plurality of communication protocol stacks;

computer readable program code for resetting the bind status of dynamic VIPAs bound to the first communication protocol stack so as to allow bind calls to the dynamic VIPAs bound to the first communication protocol stack;

computer readable program code for receiving at the second communication protocol stack a request to bind the second instance of the application with the first VIPA of the first application instance; and computer readable program code for binding the second application instance to the first VIPA at the second communication protocol stack so as to allow communications to the second application instance through the second communication protocol stack utilizing the first VIPA.

* * * * *